(12) United States Patent
Mihara et al.

(10) Patent No.: US 9,001,119 B2
(45) Date of Patent: Apr. 7, 2015

(54) DISPLAY DEVICE FOR DISPLAYING VIDEO, EYEWEAR DEVICE FOR ASSISTING IN VIEWING VIDEO, VIDEO SYSTEM WITH DISPLAY DEVICE AND EYEWEAR DEVICE, AND CONTROL METHOD OF VIDEO SYSTEM

(75) Inventors: Kazuhiro Mihara, Osaka (JP); Keisuke Suetsugi, Osaka (JP); Katsuo Saigo, Hyogo (JP); Seiji Nakazawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 72 days.

(21) Appl. No.: 13/613,837

(22) Filed: Sep. 13, 2012

(65) Prior Publication Data
US 2013/0002666 A1 Jan. 3, 2013

Related U.S. Application Data

(63) Continuation of application No. PCT/JP2012/000672, filed on Feb. 1, 2012.

(30) Foreign Application Priority Data

Feb. 4, 2011 (JP) .................................. 2011-022388

(51) Int. Cl.
*G02B 27/22* (2006.01)
*G06E 1/02* (2006.01)
(Continued)

(52) U.S. Cl.
CPC ............ *G09G 3/003* (2013.01); *H04N 13/0438* (2013.01); *G06F 3/1438* (2013.01);
(Continued)

(58) Field of Classification Search
CPC ........... G02B 27/2264; H04N 13/0438; H04N 1/32704; H04N 1/32614; H04N 1/32771; H04N 1/32702; H04N 1/32793; H04N 5/0733
USPC ................................................ 348/43, 51–60
See application file for complete search history.

(56) References Cited

U.S. PATENT DOCUMENTS 6,791,599 B1 * 9/2004 Okada et al. ..................... 348/56
2007/0229395 A1 10/2007 Slavenburg et al.
(Continued)

FOREIGN PATENT DOCUMENTS

JP 7-222087 8/1995
JP 10-243420 9/1998
(Continued)

OTHER PUBLICATIONS

International Search Report issued Apr. 3, 2012 in International (PCT) Application No. PCT/JP2012/000672.

*Primary Examiner* — David Zarka
*Assistant Examiner* — Phong Nguyen
(74) *Attorney, Agent, or Firm* — Wenderoth, Lind & Ponack, L.L.P.

(57) ABSTRACT

The instant application describes display device for switching display mode between first display mode for displaying stereoscopic images with eyewear device which adjusts incident light amounts to the left and right eyes, and second display mode different from the first display mode. The display device includes signal generator which generates timing signals for notifying timings of increasing the incident light amount to the left and right eyes in the first and second display modes or stop signals for stopping the adjustment operation, as control signals for the adjustment operation; and transmitter which transmits the control signals to the eyewear device. During the first display mode, the transmitter transmits the timing signals for the first display mode. Switching operation from the first to second display mode causes the transmitter to transmit the stop signal and then the timing signal for the second display mode to the eyewear device.

11 Claims, 23 Drawing Sheets

(51) Int. Cl.
*G09G 3/00* (2006.01)
*H04N 13/04* (2006.01)
*G06F 3/14* (2006.01)
*G09G 5/00* (2006.01)
*G09G 5/12* (2006.01)

(52) U.S. Cl.
CPC . *G09G 5/00* (2013.01); *G09G 5/12* (2013.01); *G09G 2340/0435* (2013.01); *G09G 2340/0442* (2013.01); *G09G 2380/00* (2013.01)

(56) References Cited

U.S. PATENT DOCUMENTS

| | | | |
|---|---|---|---|
| 2007/0229487 A1 | 10/2007 | Slavenburg et al. | |
| 2009/0251531 A1* | 10/2009 | Marshall et al. | 348/42 |
| 2010/0201791 A1 | 8/2010 | Slavenburg et al. | |
| 2010/0231696 A1 | 9/2010 | Slavenburg et al. | |
| 2010/0309535 A1* | 12/2010 | Landowski et al. | 359/107 |
| 2010/0328439 A1* | 12/2010 | Mihara et al. | 348/53 |
| 2011/0012904 A1 | 1/2011 | Slavenburg et al. | |
| 2011/0025821 A1* | 2/2011 | Curtis et al. | 348/43 |
| 2011/0074939 A1* | 3/2011 | Ito et al. | 348/58 |
| 2011/0115888 A1* | 5/2011 | Matsumoto et al. | 348/51 |
| 2011/0122238 A1* | 5/2011 | Hulvey et al. | 348/56 |
| 2011/0134231 A1 | 6/2011 | Hulvey et al. | |
| 2011/0216161 A1* | 9/2011 | Sato | 348/43 |
| 2011/0221788 A1* | 9/2011 | Asano et al. | 345/690 |
| 2012/0033053 A1* | 2/2012 | Park et al. | 348/51 |
| 2012/0038690 A1* | 2/2012 | Lee | 345/691 |
| 2012/0057003 A1* | 3/2012 | Ito | 348/56 |
| 2012/0092469 A1* | 4/2012 | Kovalick | 348/56 |
| 2012/0176485 A1* | 7/2012 | Miyauchi et al. | 348/56 |
| 2012/0194660 A1* | 8/2012 | Nakamura et al. | 348/56 |

FOREIGN PATENT DOCUMENTS

| | | |
|---|---|---|
| JP | 11-98538 | 4/1999 |
| JP | 2009-531979 | 9/2009 |
| JP | 2011-3992 | 1/2011 |
| JP | 2011-15216 | 1/2011 |
| JP | 2011-182264 | 9/2011 |
| WO | 2007/126904 | 11/2007 |

* cited by examiner

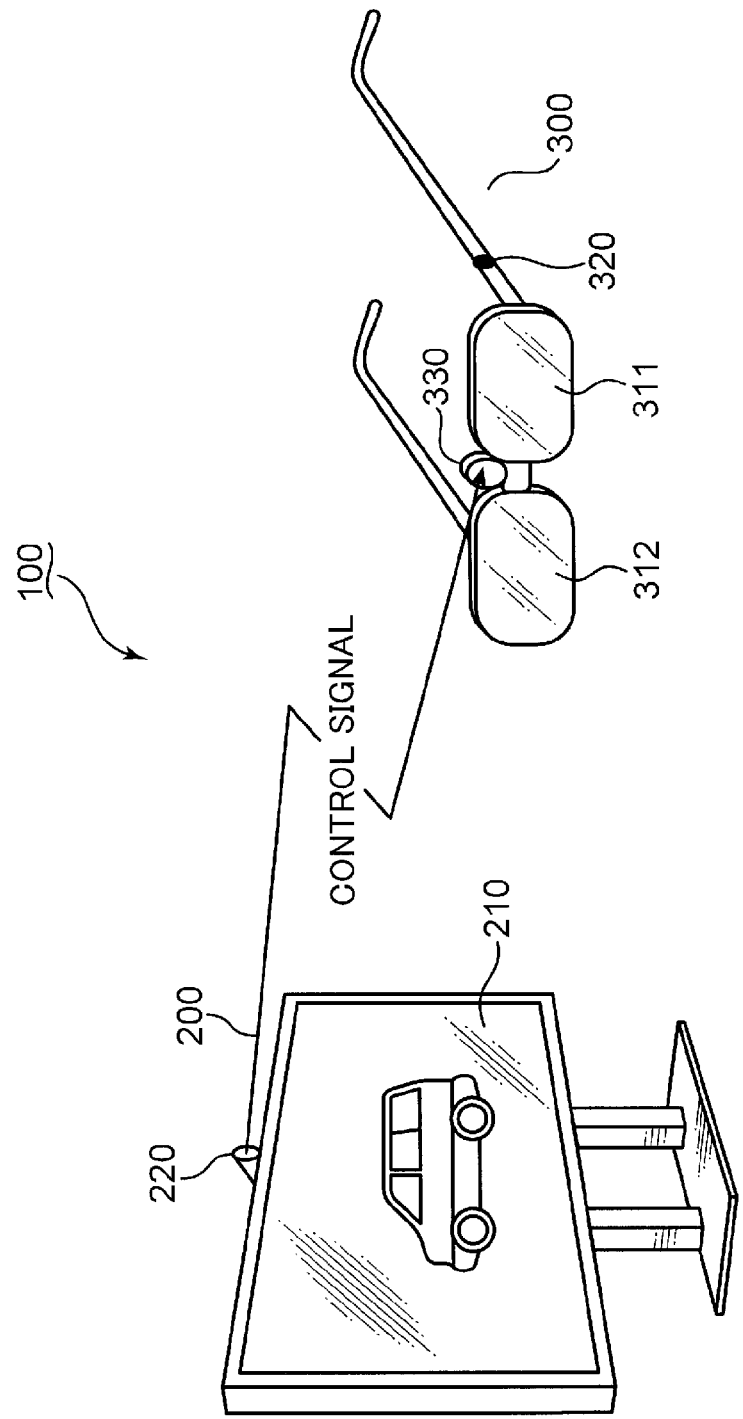

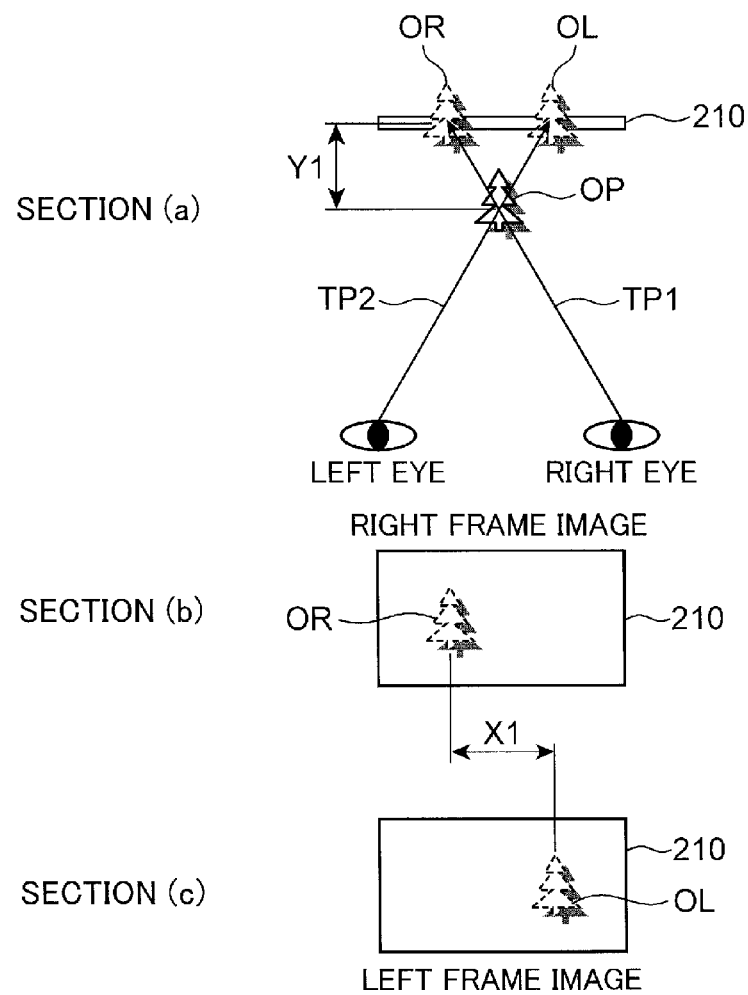

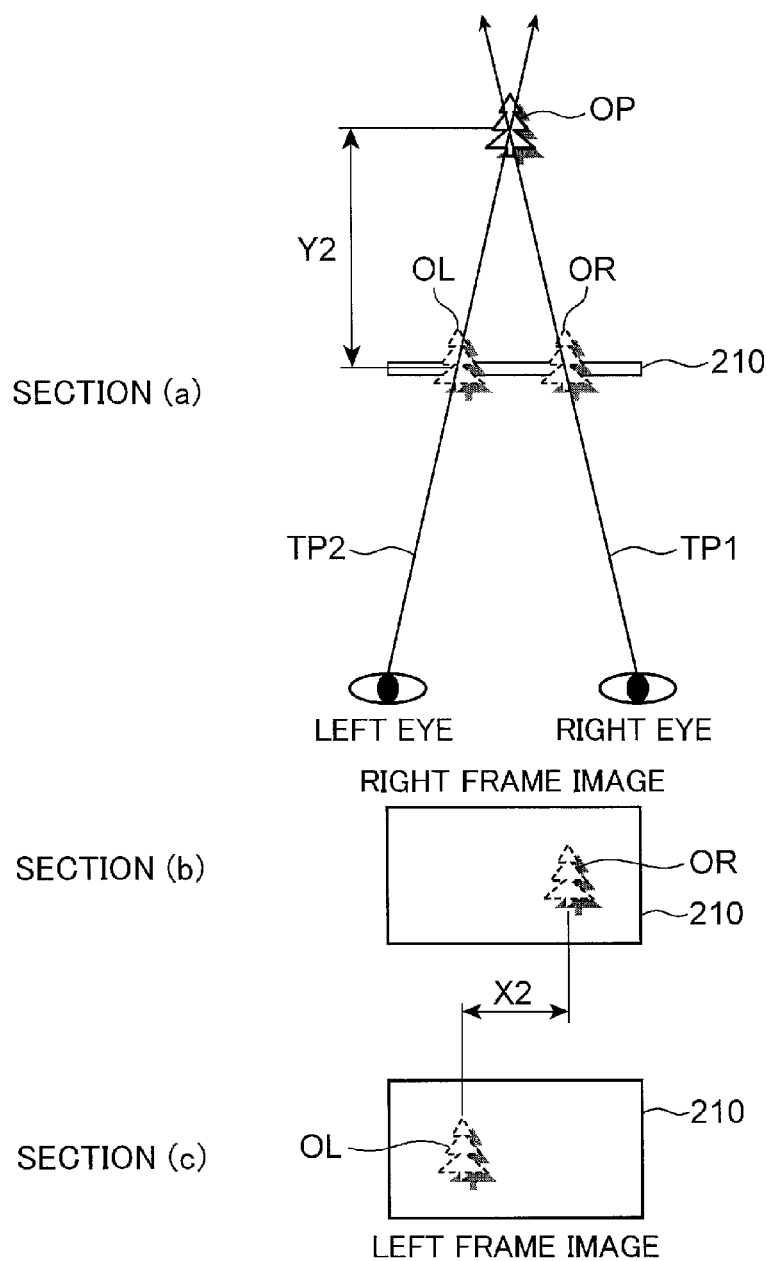

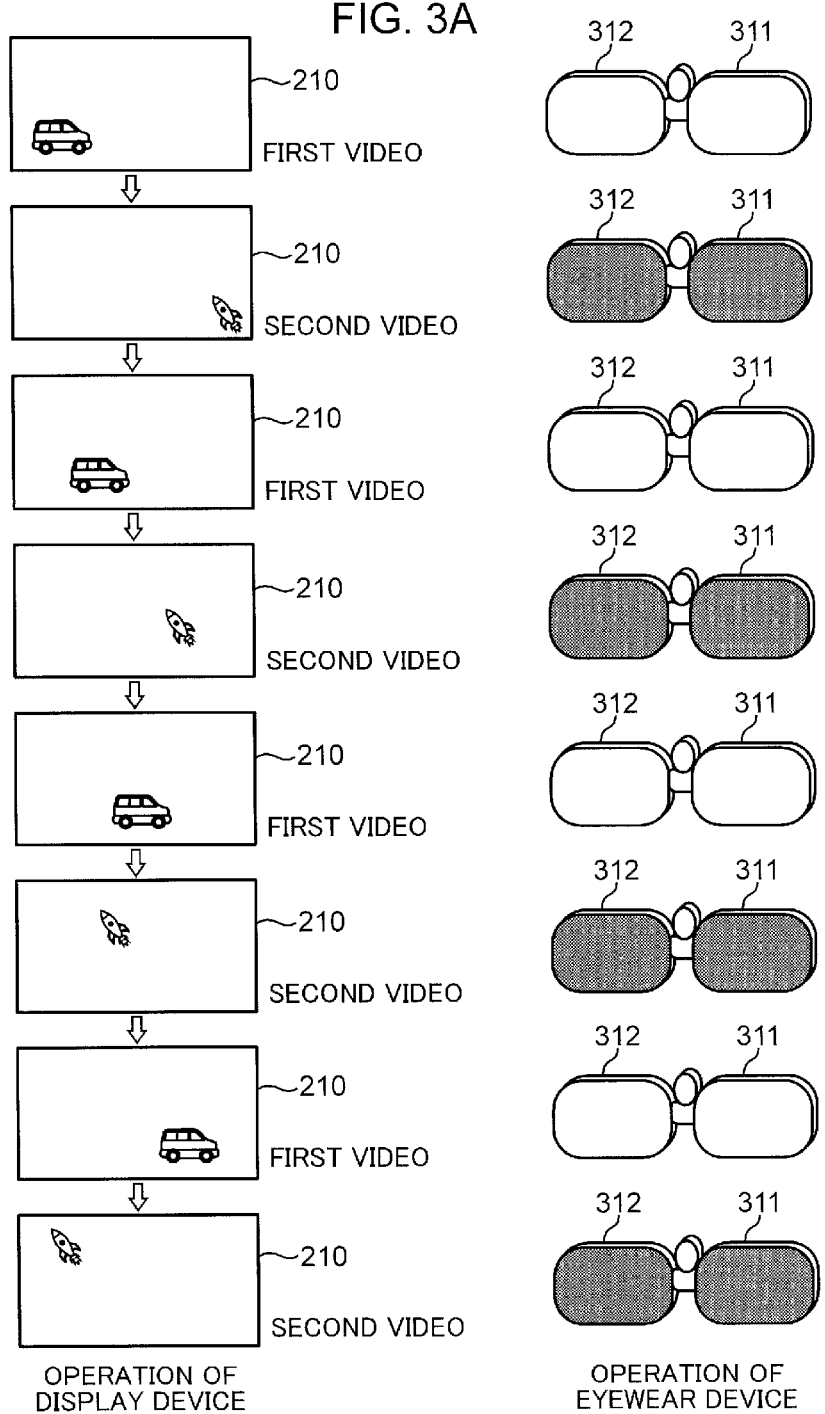

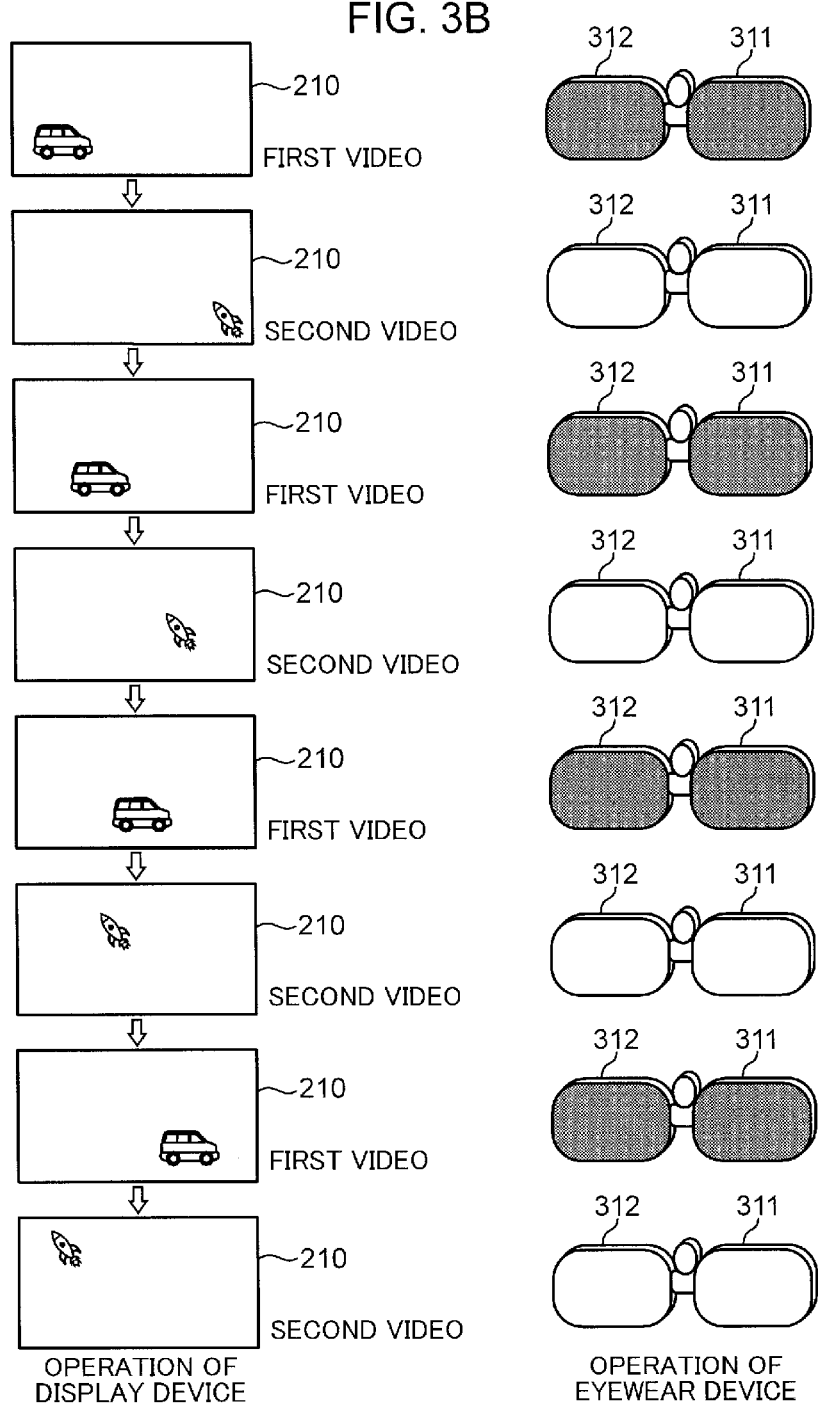

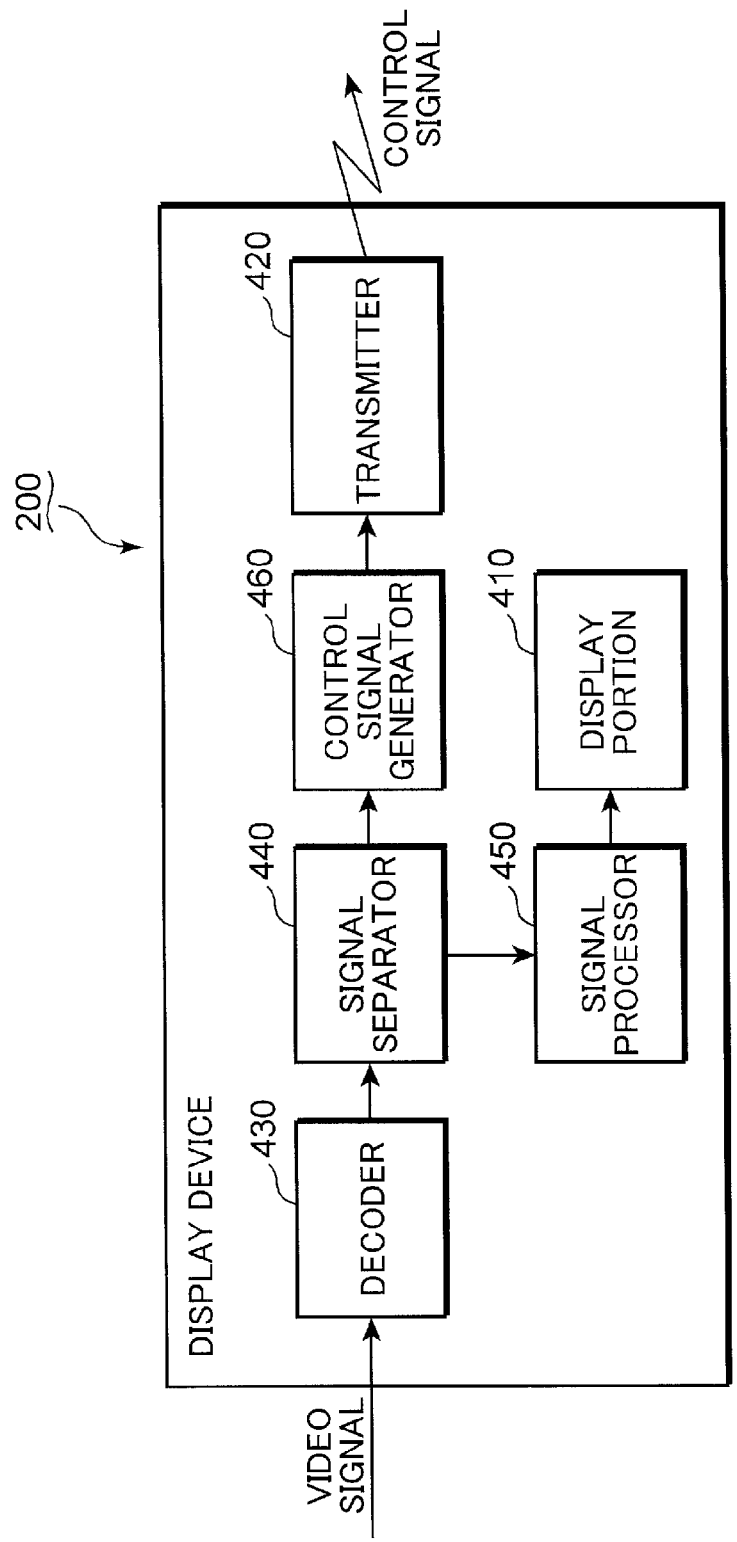

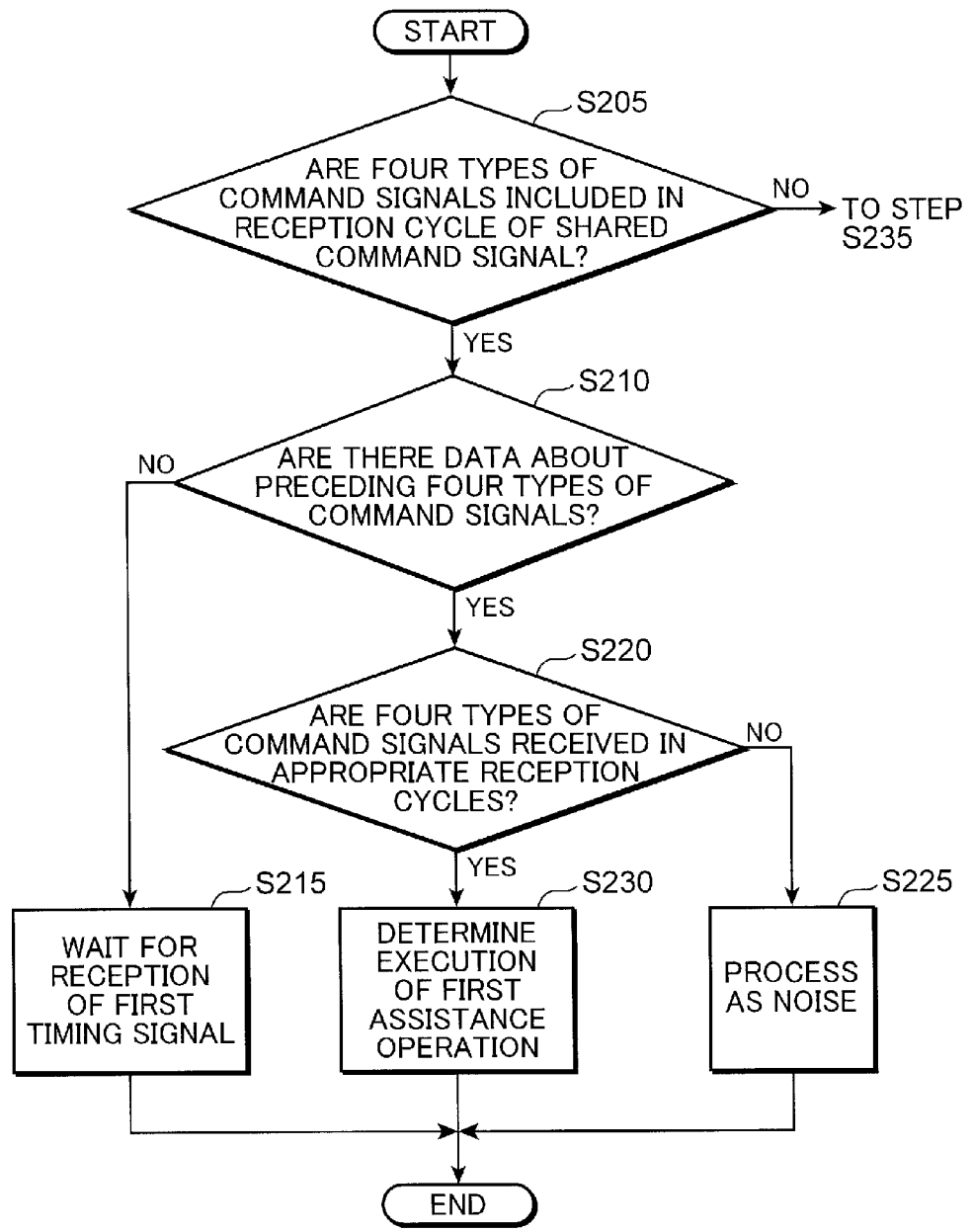

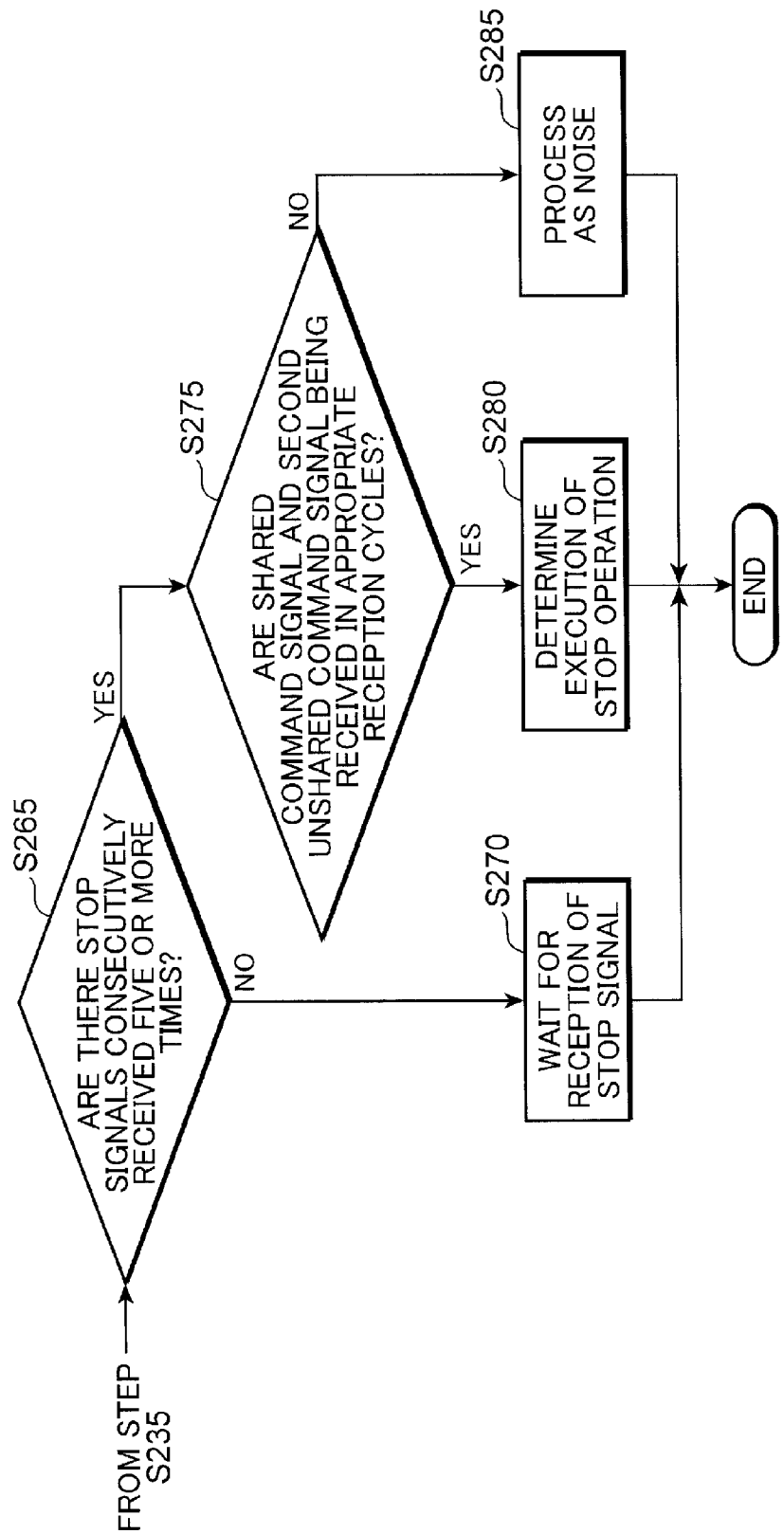

DISPLAY DEVICE FOR DISPLAYING VIDEO, EYEWEAR DEVICE FOR ASSISTING IN VIEWING VIDEO, VIDEO SYSTEM WITH DISPLAY DEVICE AND EYEWEAR DEVICE, AND CONTROL METHOD OF VIDEO SYSTEM

This application is a Continuation of International Application No. PCT/JP2012/000672, with the International Filing Date of Feb. 1, 2012.

TECHNICAL FIELD

The present application relates to technologies which allow viewers to appropriately view a desired video in response to a display mode for displaying a stereoscopic video or a display mode for displaying different contents from each other.

BACKGROUND

Active shutter systems, passive shutter systems and glasses-free systems are known as display technologies for displaying a stereoscopic video.

A typical video system according to the active shutter systems is provided with a display device designed to alternately display a left frame image, which is observed by the left eye, and a right frame image, which is observed by the right eye, and an eyewear device, which assists in viewing the video so as to make the left frame image observed only with the left eye and the right frame image observed only with the right eye. The eyewear device includes a left shutter, which is opened during display of the left frame image and closed during display of the right frame image, and a right shutter, which is opened during the display of the right frame image and closed during the display of the left frame image. The synchronization operation of the left and right shutters with the display of the left and right frame images is achieved by means of control signals which are communicated between the display device and the eyewear device.

Patent Document 1 discloses a video system according to the aforementioned active shutter system. A left field period for displaying a left frame image and a right field period for displaying a right frame image are assigned to a display period for displaying a video. At the switching timing between the left and right field periods, the display device displays a combined image between the left and right frame images. For example, a left frame image combined with a right frame image may be displayed immediately after the start of the left field period whereas a right frame image combined with a left frame image is displayed immediately after the start of the right field period. Patent Document 1 proposes closing the left and right shutters while the combination between the left and right frame images is displayed. Consequently, a viewer may be less likely to view the combined images between the left and right frame images.

The aforementioned active shutter technologies may be applied to other video views than stereoscopic videos. For example, if one display period for displaying a first video representing first contents is assigned to the left field period while another display period for displaying a second video representing second contents, which are different from the first contents, is assigned to the right field period, the display device may time-divisionally display a few videos which are different in contents. If a viewer selects the first video, the eyewear device opens the left and right shutters during the display period of the first video and closes the left and right shutters during the display period of the second video in response to control signals transmitted from the display device. If the viewer selects the second video, the eyewear device opens the left and right shutters during the display period of the second video and closes the left and right shutters during the display period of the first video in response to the control signals transmitted from the display device. Therefore, the viewer may selectively view the first and second videos.

In the following description, a display mode for displaying a stereoscopic video is referred to as "stereoscopic display mode", and the display mode for allowing a viewer to selectively view the first and second videos is referred to as "dual display mode".

Patent Documents 2 to 4 disclose video technologies which allow a viewer to select between the stereoscopic and dual display modes. According to these disclosed technologies, the viewer who selects the stereoscopic display mode may view the stereoscopic video. The viewer who selects the dual display mode may view the first or second video.

Video technologies, which allow the selection between the stereoscopic and dual display modes, requires communication of more various control information than video technologies for displaying images only in the stereoscopic display mode. Appropriate acquisition of mode information about the display mode of the display device is required for the eyewear device to accurately operate in response to the display mode of the display device. The eyewear device, which acquires the mode information instructing that the display device operates in the stereoscopic display mode, also has to obtain left open timing information about the open timing of the left shutter, left close timing information about the close timing of the left shutter, right open timing information about the open timing of the right shutter, and right close timing information about the close timing of the right shutter. The eyewear device, which acquires the mode information instructing that the display device operates in the dual display mode, also has to obtain timing information about the display start timing and display end timing of the first video if the viewer selects the first video. The eyewear device, which acquires the mode information instructing that the display device operates in the dual display mode, also has to obtain timing information about the display start timing and display end timing of the second video if the viewer selects the second video.

As described above, in order to provide various control information to the eyewear device, a protocol about control signals, which are communicated between the display device and the eyewear device, has to define various command signals. Usage of various command signals may become a cause of communicative failures between the display device and the eyewear device.

The communicative failures between the display device and the eyewear device may result in various malfunctions in the eyewear device. For example, while the display device operates in the dual display mode, the eyewear device may erroneously interpret that the control information included in the control signals represents the stereoscopic display mode. In this case, the viewer may observe the first video with the left eye and the second video with the right eye. While the display device operates in the stereoscopic display mode, the eyewear device may erroneously interpret that the control information included in the control signals represents the dual display mode. In this case, the viewer may not stereoscopically perceive the video.

Patent Document 1: WO 2007/126904 A

Patent Document 2: JP 10-243420

Patent Document 3:JP 07-222087
Patent Document 4:U.S. Patent Publication 2011/0134231 A

SUMMARY

An object of the present invention is to provide video technologies which allow a viewer to appropriately observe a video in response to a display mode of a display device.

In one general aspect, the instant application describes a display device configured to switch a display mode between a first display mode for time-divisionally displaying a left frame image, which is observed by a left eye, and a right frame image, which is observed by a right eye, to depict a stereoscopic video and a second display mode for time-divisionally displaying a first video and a second video, which are different in contents from each other. The display device includes a display portion which displays the stereoscopic video in the first display mode and the first and second videos in the second display mode; and a signal generator which generates a first control signal to notify a view start timing and a view end timing of the left and right frame images in the first display mode and a second control signal to notify a view start timing and a view end timing of one of the first and the second videos in the second display mode. The first control signal has four types of command signals including a shared command signal which is commonly used in the first and second display modes. The second control signal includes the shared command signal and a first unshared command signal which is different from the four types of command signals.

In another general aspect, the instant application describes an eyewear device for switching an operation mode between a first assistance operation for assisting in viewing a stereoscopic video and a second assistance operation for assisting in viewing one of a first video and a second video, which are different in contents from each other, in response to a control signal transmitted from a display device configured to switch a display mode between a first display mode for time-divisionally displaying a left frame image, which is observed by a left eye, and a right frame image, which is observed by a right eye, to depict the stereoscopic video and a second display mode for time-divisionally displaying the first and second videos. The eyewear device includes: a receiver configured to receive the control signal; a light amount adjuster configured to adjust an image light amount to reach each of the left and right eyes in response to the control signal including a shared command signal, which is commonly used between the first and second display modes; and a controller which controls the light amount adjuster so that the light amount adjuster executes the first assistance operation if the control signal has four types of command signals including the shared command signal, and the second assistance operation if the control signal includes the shared command signal and a first unshared command signal which is different from the four types of command signals.

In another general aspect, the instant application describes a video system including: a display device configured to switch a display mode between a first display mode for time-divisionally displaying a left frame image, which is observed by a left eye, and a right frame image, which is observed by a right eye, to depict a stereoscopic video, and a second display mode for time-divisionally displaying a first video and a second video, which are different in contents from each other; and an eyewear device which switches an operation mode between a first assistance operation for assisting in viewing the stereoscopic video and a second assistance operation for assisting in viewing the first or second video. The display device includes: a display portion configured to display the stereoscopic video in the first display mode and the first and second videos in the second display mode; a signal generator configured to generate a first control signal to notify a view start timing and a view end timing of each of the left and right frame images in the first display mode and a second control signal to notify a view start timing and view end timing of one of the first and second videos in the second display mode. The first control signal has four types of command signals including a shared command signal which is commonly used in the first and second display modes. The second control signal including the shared command signal and a first unshared command signal which is different from the four types of command signals. The display device also includes a transmitter configured to selectively transmit the first or second control signal as a control signal in response to the display mode. The eyewear device includes: a receiver configured to receive the control signal; a light amount adjuster configured to adjust an image light amount to reach each of the left and right eyes in response to the control signal; and a controller which controls the light amount adjuster so that the light amount adjuster executes the first assistance operation if the control signal has the four types of command signals including the shared command signal, and the second assistance operation if the control signal includes the shared command signal and a first unshared command signal which is different from the four types of command signals.

In another general aspect, the instant application describes a control method of a video system provided with a display device configured to switch a display mode between a first display mode for time-divisionally displaying a left frame image, which is observed by a left eye, and a right frame image, which is observed by a right eye, to depict a stereoscopic video and a second display mode for time-divisionally displaying a first video and a second video, which are different in contents from each other, and an eyewear device which switches an operation mode between a first assistance operation for assisting in viewing the stereoscopic video and a second assistance operation for assisting in viewing the first or second video. The control method includes steps of: generating a first control signal having four types of command signals including a shared command signal, which is commonly used in the first and second display modes, to notify a view start timing and a view end timing of each of the left and right frame images if the first display mode is selected, and a second control signal including the shared command signal and a first unshared command signal, which is different from the four types of command signals, to notify a view start timing and a view end timing of one of the first and second videos if the second display mode is selected; transmitting one of the first and second control signals to the eyewear device as a control signal; and causing the eyewear device to adjust an image light amount to reach each of the left and right eyes in response to the control signal.

The aforementioned video technologies may allow a viewer to appropriately observe a video in response to a display mode of a display device.

The object, features and advantages of the present invention will become more apparent based on the ensuing detailed explanation and appended drawings.

BRIEF DESCRIPTION OF THE DRAWINGS

FIG. 1 is a schematic view of an exemplary video system.

FIG. 2A is a schematic view of a display operation (stereoscopic display mode) of a display device of the video system shown in FIG. 1.

FIG. 2B is a schematic view of the display operation (stereoscopic display mode) of the display device of the video system shown in FIG. 1.

FIG. 3A is a schematic view of an operation (dual display mode) of the video system shown in FIG. 1.

FIG. 3B is a schematic view of another operation (dual display mode) of the video system shown in FIG. 1.

FIG. 4 is a block diagram schematically showing a functional configuration of the display device of the video system depicted in FIG. 1.

FIG. 17A is a schematic flowchart about signal processes for determining an operation of the eyewear device depicted in FIG. 5.

FIG. 17C is a schematic flowchart about the signal processes for determining the operation of the eyewear device depicted in FIG. 5.

DETAILED DESCRIPTION

Figure 5:
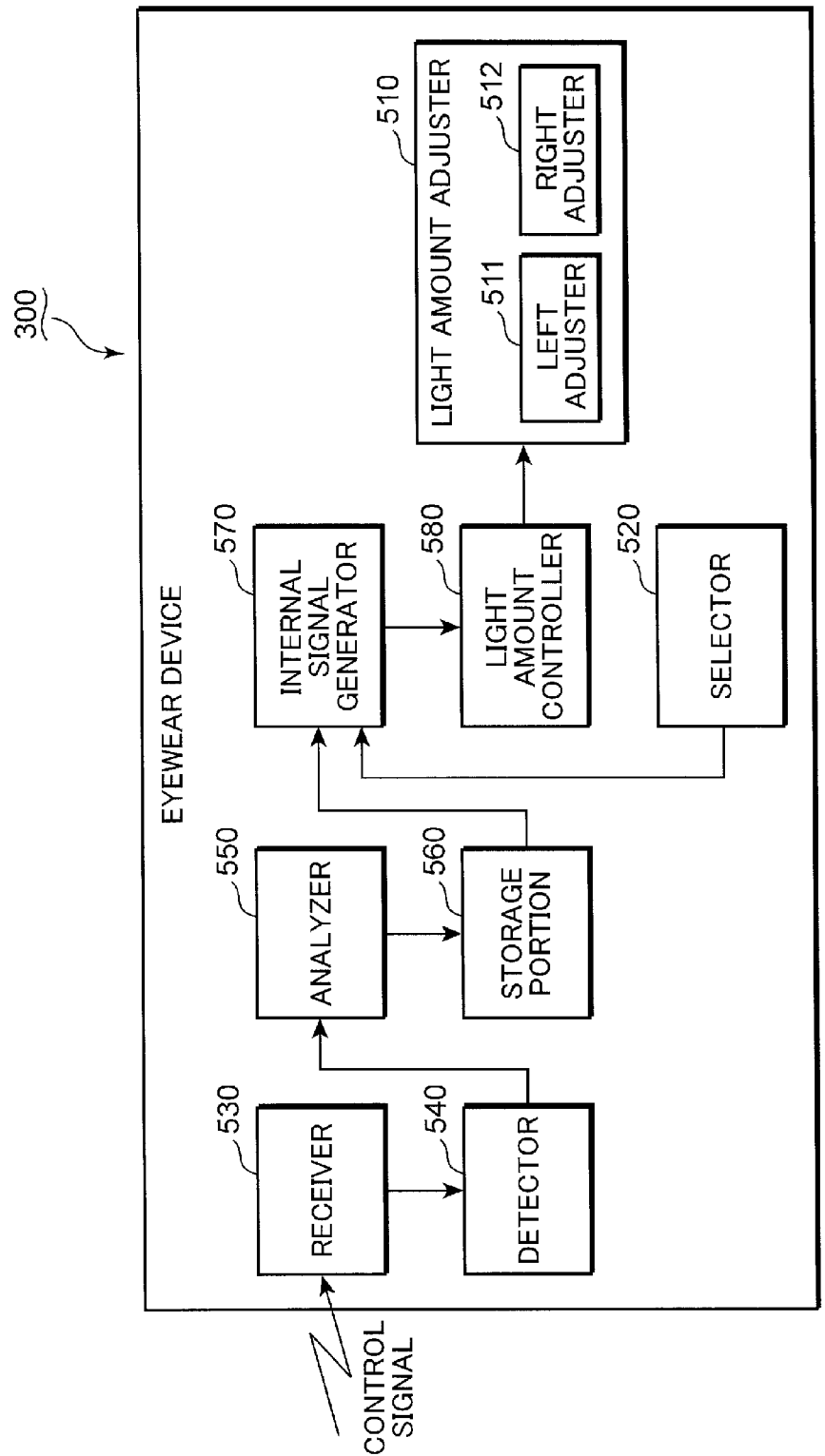
FIG. 5 is a block diagram schematically showing a functional configuration of an eyewear device of the video system depicted in FIG. 1.

A display device, which displays a video, an eyewear device, which assists in viewing the video, a video system with the display and eyewear devices, and a control method of the video system are described with reference to the drawings. It should be noted that the same reference numerals are given to the same constituent elements in various implementations. In order to clarify the description, redundant explanations are omitted as appropriate. Configurations, positional relationships or shapes shown in the drawings and the descriptions related to the drawings are provided to make principles of the various implementations easily understood. Accordingly, the principles are not limited in any way by the drawings and the detailed description with reference to the drawings.

<Video System>

FIG. 1 is a schematic view of the video system 100. The video system 100 is described with reference to FIG. 1.

As shown in FIG. 1, the video system 100 includes a display device 200, which displays a video, and an eyewear device 300, which assists in viewing the video. The display device 200 includes a display panel 210 configured to display the video. In this implementation, the display device 200 executes a display operation for displaying a stereoscopic video (hereinafter referred to as "stereoscopic display mode"), and another display operation for displaying two different contents from each other (hereinafter referred to as "dual display mode"). The display device 200 may switch the display mode between the stereoscopic and dual display modes in response to a request from a viewer. The display panel 210 may display various videos in these display modes. The eyewear device 300 performs assistance operations in response to these display modes to assist in viewing a displayed video on the display panel 210. In this implementation, the stereoscopic display mode is exemplified as the first display mode. The dual display mode is exemplified as the second display mode. It should be noted that the second display mode may be a display operation for displaying three or more mutually different contents.

FIGS. 2A and 2B are schematic views of the display operation of the display device 200 in the stereoscopic display mode. The video system 100 is further described with reference to FIGS. 1 to 2B.

Sections (a) of FIGS. 2A and 2B schematically show a positional relationship of displayed objects OR, OL on the display panel 210, an object OP perceived by the viewer, and the viewer's eyes. Sections (b) of FIGS. 2A and 2B represent the object OR, which appears on the display panel 210 displaying a right frame image that is observed by the right eye. Sections (c) of FIGS. 2A and 2B represent the object OL which appears on the display panel 210 displaying a left frame image that is observed by the left eye.

In this implementation, the display device 200, which operates in the stereoscopic display mode for displaying a stereoscopic video, time-divisionally displays left and right frame images. Therefore, the left and right frame images alternately appear on the display panel 210.

In FIG. 2A, the object OR in the right frame image is drawn to the left of the object OL in the left frame image. In FIG. 2A, the distance between the objects OR, OL is represented by the symbol "X1".

In FIG. 2B, the object OR in the right frame image is drawn to the right of the object OL in the left frame image. In FIG. 2B, the distance between the objects OR, OL is represented by the symbol "X2".

While the display device 200 performs the display operation in the stereoscopic display mode, the eyewear device 300 performs the first assistance operation for assisting in viewing a stereoscopic video. The eyewear device 300 includes a left shutter 311, which adjusts an image light amount that reaches the left eye, and a right shutter 312, which adjusts an image light amount that reaches the right eye (c.f., FIG. 1). While the viewer wears the eyewear device 300, the left shutter 311 is situated in front of the left eye whereas the right shutter 312 is situated in front of the right eye. In this implementation, the left and right shutters 311, 312 are exemplified as the light amount adjuster. It should be noted that other optical elements capable of adjusting an image light amount which reaches the left and right eyes may be used as the light amount adjuster.

If the left shutter 311 is closed, an optical path of the image light toward the left eye is blocked. Accordingly, while the left shutter 311 is closed, the viewer is less likely to view a video with the left eye. While the left shutter 311 is opened, the optical path of the image light toward the left eye is opened to increase the image light amount which reaches the left eye. The viewer may view the video with the left eye.

If the right shutter 312 is closed, an optical path of the image light toward the right eye is blocked. Accordingly, while the right shutter 312 is closed, the viewer is less likely to view a video with the right eye. While the right shutter 312 is opened, the optical path of the image light toward the right eye is opened to increase the image light amount that reaches the right eye. The viewer may view the video with the right eye.

The eyewear device 300 may control the left and right shutters 311, 312 independently. The eyewear device 300 opens the left shutter 311 and closes the right shutter 312 in synch with the display of the left frame image on the display device 200. Consequently, while the display device 200 displays the left frame image, the image light amount, which reaches the left eye, increases whereas the image light amount, which reaches the right eye, decreases. The eyewear device 300 opens the right shutter 312 and closes the left shutter 311 in synch with the display of the right frame image on the display device 200. Consequently, while the display device 200 displays the right frame image, the image light amount, which reaches the right eye, increases whereas the image light amount, which reaches the left eye, decreases. As a result of the aforementioned first assistance operation, the viewer may observe the left frame image only with the left eye and the right frame image only with the right eye.

Section (a) of FIG. 2A shows an optical path TP1 from the object OR drawn in the right frame image to the right eye, and another optical path TP2 from the object OL drawn in the left frame image to the left eye. The optical paths TP1, TP2 intersect between the display panel 210 and the viewer. In section (a) of FIG. 2A, the distance between the intersection of the optical paths TP1, TP2 and the display panel 210 is represented by the symbol "Y1". When the viewer observes the left and right frame images shown in FIG. 2A under the first assistance operation of the eyewear device 300, the viewer may perceive that the object OP comes out from the display panel 210 in a range of the distance "Y1". Consequently, the display panel 210 may appropriately display a stereoscopic video in the stereoscopic display mode.

Section (a) of FIG. 2B shows the optical path TP1 from the object OR drawn in the right frame image to the right eye, and the optical path TP2 from the object OL drawn in the left frame image to the left eye. The optical paths TP1, TP2 intersect at a more distant position by the distant "Y2" from the viewer than the display panel 210. When the viewer observes the left and right frame images shown in FIG. 2B under the first assistance operation of the eyewear device 300, the viewer may perceive that the object OP recedes from the display panel 210 in a range of the distance "Y2". Consequently, the display panel 210 may appropriately display a stereoscopic video in the stereoscopic display mode.

FIGS. 3A and 3B are schematic views showing an operation of the display device 200 and the eyewear device 300 in the dual display mode. The video system 100 is further described with reference to FIGS. 1, 3A and 3B.

In the dual display mode, the display device 200 time-divisionally displays a first video and a second video, which are different in contents from each other. Consequently, the first and second videos are alternately displayed on the display panel 210. In FIGS. 3A and 3B, images of an "automobile" are depicted as the first video while images of a "rocket" are depicted as the second video.

As shown in FIG. 1, the eyewear device 300 includes a switching device 320. The viewer may operate the switching device 320 to select one of the first and second videos. In this implementation, the switching device 320 is exemplified as the selector.

FIG. 3A schematically shows the operation of the eyewear device 300 when the viewer selects the first video. FIG. 3B schematically shows the operation of the eyewear device 300 when the viewer selects the second video.

If the display mode of the display device 200 is switched from the stereoscopic display mode to the dual display mode, the eyewear device 300 switches the operation mode from the first assistance operation for assisting in viewing the stereoscopic video to the second assistance operation for assisting in viewing the first or second video. If the display mode of the display device 200 is switched from the dual display mode to the stereoscopic display mode, the eyewear device 300 switches the operation mode from the second assistance operation to the first assistance operation. The switching control of the operation mode in response to the switching operation of the display mode is described later.

As shown in FIG. 3A, if the viewer selects the first video, the eyewear device 300 opens both the left and right shutters 311, 312 in synch with the display of the first video. Consequently, the viewer may observe the first video with both eyes. The eyewear device 300 closes both the left and right shutters 311, 312 in synch with the display of the second video. Consequently, the viewer may observe the first video without observing the second video.

As shown in FIG. 3B, if the viewer selects the second video, the eyewear device 300 opens both the left and right shutters 311, 312 in synch with the display of the second video. Consequently, the viewer may observe the second video with both eyes. The eyewear device 300 closes both the left and right shutters 311, 312 in synch with the display of the first video. Consequently, the viewer may observe the second video without observing the first video.

As shown in FIG. 1, the display device 200 includes a transmission device 220 configured to transmit control signals, which are used for controlling the eyewear device 300. The eyewear device 300 includes a reception device 330 configured to receive the control signals. The control signal includes various command signals for communicating information, which is required for achieving the aforementioned operation of the eyewear device 300 in synch with the display operation of the display device 200. A configuration of the control signal is described later.

<Configuration of Display Device>

FIG. 4 is a block diagram schematically showing a functional configuration of the display device 200. The display device 200 is described with reference to FIGS. 1 and 4.

The display device 200 includes a decoder 430, a signal separator 440, a signal processor 450, a control signal generator 460, a display portion 410 and a transmitter 420. The display portion 410 corresponds to the display panel 210 described with reference to FIG. 1. The transmitter 420 corresponds to the transmission device 220 described with reference to FIG. 1.

Encoded video signals are externally input into the decoder 430. The decoder 430 decodes the input video signals. The decoder 430 outputs the decoded video signals to the signal separator 440. In this implementation, the decoded video signals are used as input signals to the display device 200. Alternatively, other signals including information, which is required for displaying a video, may be input to the display device 200.

The signal separator 440 identifies whether the video signals are used for displaying a stereoscopic video (hereinafter referred to as "stereoscopic video signals") or the dual display mode (hereinafter referred to as "dual mode video signals"). If the stereoscopic video signals are input to the signal separator 440, the signal separator 440 separates the input video signals into video signals for displaying left frame images (hereinafter referred to as "L video signals") and video signals for displaying right frame images (hereinafter referred to as "R video signals"). If the dual mode video signals are input to the signal separator 440, the input video signals are separated into video signals for displaying a first video (hereinafter referred to as "first video signals") and video signals for displaying a second video (hereinafter referred to as "second video signals"). The video signals, which are separated by the signal separator 440, are output to the signal processor 450 and the control signal generator 460.

The signal processor 450 processes the video signals (L and R video signals or first and second video signals), which are separated by the signal separator 440 so that the video signals become suitable to a display format of the display portion 410. For example, the signal processor 450 changes color gamut information defined by the video signals to a color gamut according to a display ability of the display portion 410. The signal processor 450 may also execute processes for reducing afterglow which interfere with viewing the video. The signal processor 450 may change a frame rate (frame field) defined by the video signals to a suitable frequency for a display scheme or display ability of the display portion 410. The video signals, which are processed by the signal processor 450, are output to the display portion 410.

The display portion 410 displays the video signals processed by the signal processor 450 as a video. If the signal processor 450 processes the L and R video signals, the display portion 410 alternately displays the left and right frame images. If the signal processor 450 processes the first and second video signals, the display portion 410 alternately displays the first and second videos.

As described above, the display portion 410 corresponds to the display panel 210 described with reference to FIG. 1. A liquid crystal display panel, a plasma display panel, or another display device capable of displaying a video may be used as the display portion 410.

The control signal generator 460 identifies whether the video signals input to the display device 200 are the stereoscopic video signals or the dual mode video signals on the basis of information contained in the video signals, which are separated by the signal separator 440. If the stereoscopic video signals are used as the video signals, the control signal generator 460 generates control signals for causing the eyewear device 300 to execute the first assistance operation. If the dual mode video signals are used as the video signals, the control signal generator 460 generates control signals for causing the eyewear device 300 to execute the second assistance operation.

When the viewer changes a channel, for instance, the video signals input to the display device 200 may be switched from the stereoscopic video signals to the dual mode video signals or from the dual mode video signals to the stereoscopic video signals. The control signal generator 460 may identify the change in the video signal type on the basis of information contained in the video signals, which are separated by the signal separator 440. The control signal generator 460 generates control signals to stop the operation of the eyewear device 300 in response to the switching operation between the stereoscopic and dual display modes. These control signals are output to the transmitter 420. After generating the control signal for the stoppage, the control signal generator 460 generates control signals in response to the switched video signals. It should be noted that a configuration of these control signals is described later.

The transmitter 420 transmits the control signals, which are generated by the control signal generator 460, to the eyewear device 300. As described above, the transmitter 420 corresponds to the transmission device 220 described with reference to FIG. 1. In this implementation, infrared signals are used as the control signals. Alternatively, the control signals may be RF signals or other signals capable of communicating information required for the operation of the eyewear device 300. Based on the aforementioned configuration, the eyewear device 300 may automatically follow to switch its operation in response to a video type displayed on the display device 200. This makes a viewer less likely to inappropriately view a video although there may be an asynchronous operation between displayed images on the display device 200 and the eyewear device 300 when the display device switches the displayed video type.

<Configuration of Eyewear Device>

FIG. 5 is a block diagram schematically showing a functional configuration of the eyewear device 300. The eyewear device 300 is described with reference to FIGS. 1 and 5.

The eyewear device 300 includes a receiver 530, a detector 540, an analyzer 550, a storage portion 560, an internal signal generator 570, a light amount controller 580, a selector 520 and a light amount adjuster 510.

The receiver 530 corresponds to the reception device 330 described with reference to FIG. 1. The receiver 530 receives the control signals (infrared signals) transmitted from the display device 200. The receiver 530 then converts the control signals into electric signals. The control signals, which are converted into the electric signals, are output to the detector 540.

The detector 540 detects command signals (described later) included in the control signals. It should be noted that types of the command signals to be used is determined by a communication protocol in advance between the display device 200 and the eyewear device 300. The command signals detected by the detector 540 are output to the analyzer 550. The detector 540 may eliminate signals out of definitions under the communication protocol as noise signals.

The analyzer 550 analyzes information, which is required for the control of the eyewear device 300 (operational control of the left and right shutters 311, 312 described with reference to FIG. 1), by means of the command signals output from the detector 540. For instance, the analyzer 550 identifies command signal types. In addition, the analyzer 550 may measure a reception time of each of the command signals. For example, the analyzer 550 may use the reception time information of the command signals to calculate reception intervals for the same type of command signals. The analyzer 550 may also use the reception time information of the command signals to acquire information about a reception order for the types of command signals. Optionally, the analyzer 550 may compare the operation of the eyewear device 300 with the received command signals to analyze a required operation for the eyewear device 300. If the analyzer 550 acquires information, which is undefined in the communication protocol, the analyzer 550 may eliminate the command signals output from the detector 540 as noise signals. The information obtained by the analyzer 550 is output to the storage portion 560.

The storage portion 560 stores various information acquired by the analyzer 550 (e.g., information about types and reception times of command signals, reception intervals of identical command signals, and a reception order for types of command signals). The storage portion 560 may be various memory devices capable of storing information.

The selector 520 corresponds to the switching device 320 described with reference to FIG. 1. Information about whether the viewer selects the first or second video is output from the selector 520 to the internal signal generator 570.

The internal signal generator 570 reads the information stored in the storage portion 560. The internal signal generator 570 generates internal signals to operate the light amount adjuster 510 in response to the read information. The internal signals are output to the light amount controller 580. If the receiver 530 receives control signals instructing execution of the second assistance operation, the internal signal generator 570 generates the internal signals in response to the output information from the selector 520 as well as the stored information stored in the storage portion 560. On the other hand, if the receiver 530 receives control signals instructing execution of the first assistance operation, the internal signal generator 570 generates internal signals in response to the stored information in the storage portion 560 without depending on the output information from the selector 520.

The light amount controller 580 generates drive signals to drive the light amount adjuster 510 in response to the internal signals generated by the internal signal generator 570. The drive signals are output to the light amount adjuster 510.

The light amount adjuster 510 includes a left adjuster 511, which adjusts the image light amount that reaches the left eye, and a right adjuster 512, which adjusts the image light amount that reaches the right eye. The left adjuster 511 corresponds to the left shutter 311 described with reference to FIG. 1. The right adjuster 512 corresponds to the right shutter 312 described with reference to FIG. 1. If the left are right shutters 311, 312 are liquid crystal shutter devices with liquid crystals, the aforementioned light amount controller 580 may be a drive circuit designed to drive the liquid crystals of the liquid crystal shutter devices.

The left and right adjusters 511, 512 operate in response to the drive signals from the light amount controller 580. As described above, if the receiver 530 receives control signals instructing execution of the first assistance operation, the light amount controller 580 outputs drive signals, which cause the light amount adjuster 510 to execute the first assistance operation. Consequently, when the display device 200 displays the left frame image, the left adjuster 511 increases the image light amount which reaches the left eye whereas the right adjuster 512 decreases the image light amount which reaches the right eye. When the display device 200 displays the right frame image, the left adjuster 511 decreases the image light amount which reaches the left eye whereas the right adjuster 512 decreases the image light amount which reaches the right eye. If the selector 520 notifies the internal signal generator 570 that the first video is selected and if the display device 200 displays the first video, the left and right adjusters 511, 512 increase the image light amount which reaches both eyes. On the other hand, if the selector 520 notifies the internal signal generator 570 that the first video is selected and if the display device 200 displays the second video, the left and right adjusters 511, 512 reduce the image light amount which reaches both eyes. If the selector 520 notifies the internal signal generator 570 that the second video is selected and if the display device 200 displays the second video, the left and right adjusters 511, 512 increase the image light amount which reaches both eyes. On the other hand, if the selector 520 notifies the internal signal generator 570 that the second video is selected and if the display device 200 displays the first video, the left and right adjusters 511, 512 reduce the image light amount which reaches both eyes.

As described later, the detector 540, the analyzer 550, the storage portion 560, the internal signal generator 570 and the light amount controller 580 are used for controlling various operations, which are executed by the light amount adjuster 510. In this implementation, the detector 540, the analyzer 550, the storage portion 560, the internal signal generator 570 and the light amount controller 580 are exemplified as the controller. It should be noted that the controller may be realized as a software program which uses an information processor such as a CPU.

In this implementation, the internal signal generator 570 generates internal signals which define operation of the light amount adjuster 510 in response to control signals received by the receiver 530. Alternatively, the analyzer may directly control the light amount adjuster in response to command signals detected by the detector. In this case, the light amount adjuster is directly controlled in response to control signals received by the receiver.

In this implementation, the selector 520 outputs information about a selected video by a viewer to the internal signal generator 570. If control signals received by the receiver 530 instruct execution of the second assistance operation, the internal signal generator 570 generates internal signals in response to information from the selector 520. Alternatively, the selector may output the information about the selected video by the viewer to the light amount controller. The light amount controller may generate and output drive signals to drive the light amount adjuster in response to the internal signals from the internal signal generator and the selection information from the selector.

<Operation of Eyewear Device>

As described above, the light amount adjuster 510 of the eyewear device 300 adjusts the image light amount which reaches the left and right eyes in response to the control signals transmitted from the display device 200. The control signal received by the eyewear device 300 includes a signal, which makes the light amount adjuster 510 execute the first assistance operation for viewing a stereoscopic video, a signal, which makes the light amount adjuster 510 execute the second assistance operation for viewing a first or second video, and a signal, which stops the light amount adjuster 510. Among these signals, the signal for executing the first or second assistance operation notifies timing information for synchronizing the adjustment operation to the light amount by the light amount adjuster 510 with the video display operation of the display device 200. Accordingly, the control signals for executing the first and second assistance operations are referred to as "timing signals" in the following description. The control signal for stopping the light amount adjuster 510 is referred to as "stop signal" in the following description.

Figure 6:
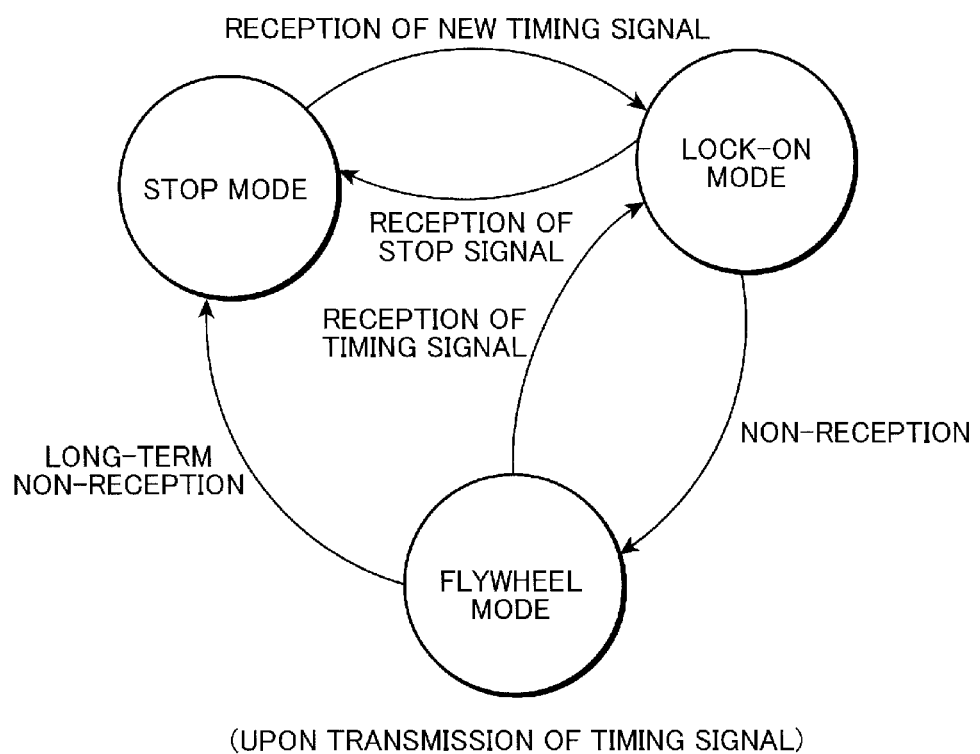
FIG. 6 is a schematic view showing a change in the operation mode of the eyewear device depicted in FIG. 5.

FIG. 6 is a schematic view showing a change in the operation mode of the eyewear device 300 while the display device 200 transmits the timing signals. The operation of the eyewear device 300 is described with reference to FIGS. 3 to 6.

The operation of the eyewear device 300 changes among a lock-on mode, a flywheel mode and a stop mode.
(Lock-on Mode)

While the receiver 530 appropriately receives the timing signals, the eyewear device 300 operates in the lock-on mode. In the lock-on mode, the operation of the light amount adjuster 510 is locked on to the timing signals.

The control signal generator 460 of the display device 200 operating in the stereoscopic display mode generates a timing signal (hereinafter referred to as "first timing signal") which includes a command signal, which notifies the view start timing of the left frame image, a command signal, which notifies the view end timing of the left frame image, a command signal, which notifies the view start timing of the right frame image, and a command signal, which notifies the view end timing of the right frame image. The light amount adjuster 510 of the eyewear device 300 operates in response to the first timing signal including these four types of the command signals. In this implementation, the first timing signal is exemplified as the first control signal.

The left adjuster 511 increases the image light amount which reaches the left eye at the time determined by the command signal that notifies the view start timing of the left frame image. In the following description, the command signal which notifies the view start timing of the left frame image is referred to as "left increase signal". The left adjuster 511 decreases the image light amount which reaches the left eye at the time determined by the command signal that notifies the view end timing of the left frame image. In the following description, the command signal which notifies the view end timing of the left frame image is referred to as "left decrease signal". The right adjuster 512 increases the image light amount which reaches the right eye at the time determined by the command signal that notifies the view start timing of the right frame image. In the following description, the command signal which notifies the view start timing of the right frame image is referred to as "right increase signal". The right adjuster 512 decreases the image light amount which reaches the right eye at the time determined by the command signal that notifies the view end timing of the right frame image. In the following description, the command signal which notifies the view end timing of the right frame image is referred to as "right decrease signal".

If the display device 200 operates in the stereoscopic display mode and if the receiver 530 appropriately receives the first timing signal, the light amount controller 580 of the eyewear device 300 determines the adjustment timing to the image light amount, which reaches the left and right eyes, in response to the left increase signal, the left decrease signal, the right increase signal and the right decrease signal, which make the light amount adjuster 510 execute the first assistance operation in the lock-on mode.

The control signal generator 460 of the display device 200 operating in the dual display mode generates a timing signal (hereinafter referred to as "second timing signal") including a command signal, which notifies the view start timing of the first video, and a command signal, which notifies the view end timing of the first video. If the selector 520 of the eyewear device 300 notifies the internal signal generator 570 that the first video is selected by the viewer, the internal signal generator 570 generates internal signals which cause the light amount adjuster 510 to execute the adjustment operation to the light amount at the time determined by these two types of the command signals. If the selector 520 of the eyewear device 300 notifies the internal signal generator 570 that the second video is selected by the viewer, the internal signal generator 570 generates internal signals which cause a delay in the adjustment operation to the light amount by the light amount adjuster 510 by a predetermined amount with respect to the reception cycle of these two types of command signals.

In this implementation, the control signal generator 460 generates a second timing signal including a command signal, which notifies the view start timing of the first video, and a command signal, which notifies the view end timing of the first video. Alternatively, the control signal generator may generate a second timing signal including a command signal, which notifies the view start timing of the second video, and a command signal, which notifies the view end timing of the second video. It should be noted that the second timing signal is exemplified as the second control signal. The control signal generator 460 is exemplified as the signal generator.

If the selector 520 of the eyewear device 300 notifies the internal signal generator 570 that the first video is selected by the viewer, the left and right adjusters 511, 512 increase the light amount, respectively, which reaches the left and right eyes, at the time determined by the command signal, which notifies the view start timing of the first video. In the following description, the command signal, which notifies the view start timing of the first video, is referred to as "increase signal". If the selector 520 of the eyewear device 300 notifies the internal signal generator 570 that the second video is selected by the viewer, the left and right adjusters 511, 512 increase the light amount, respectively, which reaches the left and right eyes, with a predetermined phase delay, with respect to the time determined by the increase signal.

If the selector 520 of the eyewear device 300 notifies the internal signal generator 570 that the first video is selected by the viewer, the left and right adjusters 511, 512 decrease the light amount, respectively, which reaches the left and right eyes, at the time determined in the command signal which notifies the view end timing of the first video. In the following description, the command signal, which notifies the view end timing of the first video, is referred to as "decrease signal". If the selector 520 of the eyewear device 300 notifies the internal signal generator 570 that the second video is selected by the viewer, the left and right adjusters 511, 512 decrease the light amount, respectively, which reaches the left and right eyes, with a predetermined phase delay, with respect to the time determined by the decrease signal.

As described above, the two types of command signals are used as the second timing signal in the dual display mode. The eyewear device 300 uses information about reception cycles of the two types of command signals to determine the display timing of the first and second videos. Accordingly, the synchronization control between the display device 200 and the eyewear device 300 is achieved by means of a fewer numbers of types of command signals. The configuration of various command signals, which are transmitted in the stereoscopic and dual display modes, is described later.
(Flywheel Mode)

There may be communicative failures between the display device 200 and the eyewear device 300 because of an obstacle passing between the viewer and the display device 200, noise or other factors. When a non-reception period, during which the receiver 530 fails to appropriately receive the timing signals, is started, the eyewear device 300 operates in the flywheel mode. In the flywheel mode, the operation of the light amount adjuster 510 relies on the timing signals which are appropriately received before the start of the non-reception period.

While the receiver 530 appropriately receives the first timing signal, the storage portion 560 sequentially stores information about the left increase signal, the left decrease signal, the right increase signal and the right decrease signal. While the receiver 530 appropriately receives the second timing signal, the storage portion 560 sequentially stores information about the reception time of the increase signal and the decrease signal. Once the non-reception time starts, the internal signal generator 570 generates internal signals by means of the reception times stored in the storage portion 560. Consequently, even without timing signals appropriately received, the light amount adjuster 510 may continue the adjustment operation to the light amount.
(Stop Mode)

In terms of viewer's safeties and/or for a reason of control, the stop mode is set to stop the left and right adjusters 511 in a condition where the image light amount, which reaches the left and right eyes, remains increased. If the aforementioned flywheel mode is continued for a long time, the synchronization between the adjustment operation to the light amount by the light amount adjuster 510 and the display operation of the display portion 410 may not be maintained. The stop mode is set in order to avoid such inconvenience. In the stop mode, the light amount adjuster 510 is stopped with maintaining a condition where the light amount adjuster 510 allows light transmission (i.e., stopped with maintaining an opening orientation of the left and right shutters 311, 312). Accordingly, the viewer may view the ambience with wearing the eyewear device 300. Consequently, the viewer may safely perform intended actions.

As described below, the stop mode is carried out between the stereoscopic display mode and the dual display mode. The stop mode between the stereoscopic display mode and the dual display mode is advantageous if IR signals are transmitted between the display device 200 and the eyewear device 300. There are various disturbance IR pulses, for example, from fluorescent bulbs. The stop mode between the stereoscopic display mode and the dual display mode contributes to facilitating to identify the disturbance pulses and making the communication between the display device 200 and the eyewear device 300 robust against such noise.
(Transit between Lock-on Mode and Flywheel Mode)

While the receiver 530 appropriately receives the timing signals, the operation in the lock-on mode is executed. Once the non-reception period without any reception of the timing signal and the stop signal starts, the operation of the eyewear device 300 is changed from the lock-on mode to the flywheel mode. The internal signal generator 570 may measure a time length of the non-reception period. If the receiver 530 appropriately receives the timing signal before the time length measured by the internal signal generator 570 exceeds the threshold period, which is determined for the non-reception period in advance, the eyewear device 300 operates in the lock-on mode once again.
(Transit between Flywheel Mode and Stop Mode)

If the time length measured by the internal signal generator 570 exceeds the threshold period (e.g., several minutes), which is determined for the non-reception period in advance, the internal signal generator 570 outputs internal signals toward the light amount controller 580 to stop the adjustment operation to the light amount by the light amount adjuster 510. Consequently, the operation of the eyewear device 300 changes from the flywheel mode to the stop mode. Since the eyewear device 300 is kept in the non-reception condition for a long time, the operational stop of the eyewear device 300 contributes to a reduction in unnecessary power consumption.
(Transit between Stop Mode and Lock-on Mode)

If the receiver 530 receives the first timing signal during the stop mode, information about the reception times of the left increase signal, the left decrease signal, the right increase signal and the right decrease signal is sequentially stored in the storage portion 560. If the receiver 530 receives the second timing signal during the stop mode, the storage portion 560 sequentially stores the information about the reception times of the increase signal and the decrease signal. Once the storage portion 560 stores sufficient information for the internal signal generator 570 to determine the increase period timing, in which an incident light amount to the left and right eyes is increased, the operation of the eyewear device 300 changes from the stop mode to the lock-on mode.

As described above, when the video signal input to the display device 200 is switched from the stereoscopic video signal to the dual mode video signal or from the dual mode video signal to the stereoscopic video signal, the control signal generator 460 of the display device 200 generates the stop signals. The transmitter 420 of the display device 200 then transmits the stop signals to the eyewear device 300.

The operation mode change of the eyewear device 300 while the display device 200 transmits the stop signal is described. It should be noted that the term "non-reception period" refers to a period in which the stop signals is not appropriately received as well as the period in which the timing signal is not appropriately received. It should be noted that the flywheel mode during the transmission of the stop signals from the display device 200 (i.e., the flywheel mode while the receiver 530 of the eyewear device 300 does not appropriately receive the stop signals) is the same as the aforementioned flywheel mode.

If the receiver 530 of the eyewear device 300 operating in the lock-on mode receives the stop signals, the operation of the eyewear device 300 changes from the lock-on mode to the stop mode. As described above, the reception of the stop signals means the display mode change of the display portion 410. The display mode change may result in a change in display timings of the frame images. In this implementation, since the operation of the light amount adjuster 510 stops pursuant to the reception of the stop signals, the viewer is less likely to perceive a flicker, which is caused by asynchronous operation between the opening/closing operation of the light amount adjuster 510 and the frame image display.

In this implementation, the transmitter 420 of the display device 200 repeatedly transmits the stop signals a predetermined number of times in response to the switching operation from the dual display mode to the stereoscopic display mode. The transmitter 420 then transmits the first timing signals to the eyewear device 300. The transmitter 420 of the display device 200 repeatedly transmits the stop signals a predetermined number of times in response to the switching operation from the stereoscopic display mode to the dual display mode. The transmitter 420 then transmits the second timing signals to the eyewear device 300.

The receiver 530 of the eyewear device 300 receives the timing signal which is transmitted in the new display mode. If the display mode of the display device 200 is switched from the dual display mode to the stereoscopic display mode, the analyzer 550 obtains information about the reception times of the left increase signal, the left decrease signal, the right increase signal and the right decrease signal from the first timing signal and stores the information in the storage portion 560. If the display mode of the display device 200 is switched from the stereoscopic display mode to the dual display mode, information about the reception times of the increase signal and the decrease signal is acquired and stored in the storage portion 560.

The internal signal generator 570 ignores control information, which is recorded in the storage portion 560 before the reception of the stop signals, and generates internal signals in response to the signal (first or second timing signal) received by the receiver 530 after the switching operation of the display mode.

The internal signal generator 570 may average the reception times of the left increase signal, the left decrease signal, the right increase signal and the right decrease signal obtained from several first timing signals. The internal signal generator 570 may determine a timing of a period, during which the left adjuster 511 increases the light amount, in response to the averaged reception times of the left increase signal and the left decrease signal. The internal signal generator 570 may determine a timing of a period, during which the right adjuster 512 increases the light amount, in response to the averaged reception times of the right increase signal and the right decrease signal. The internal signal generator 570 may determine a time of a period, during which the left and right adjusters 511, 512 go up the light amount, in response to the averaged reception times of the increase signal and the decrease signal.

The internal signal generator 570 may generate internal signals including the timing information determined by the aforementioned averaging processes. The stop mode is continued until the information is acquired enough for the internal signal generator 570 to generate the internal signals. The operation of the eyewear device 300 changes to the lock-on mode once the internal signal generator 570 generates the internal signals to operate the light amount adjuster 510.

In this implementation, when the video signal input to the display device 200 is switched from the stereoscopic video signal to the dual mode video signal or from the dual mode video signal to the stereoscopic video signal, the control signal generator 460 of the display device 200 generates the stop signals. Additionally, the control signal generator 460 may generate the stop signals if a channel is changed to switch a displayed video program. In other words, if the viewer viewing the stereoscopic video changes a video program to request displaying another stereoscopic video, the control signal generator 460 may generate the stop signals. Or when the viewer viewing a displayed video in the dual display mode changes a video program to request displaying another video in the dual display mode, the control signal generator 460 may generate the stop signals. Alternatively, the control signal generator 460 may generate the stop signals if there is a significant change in a video display cycle determined by video signals separated by the signal separator 440.

As described above, in the lock-on mode, an operating frequency of the light amount adjuster 510 is a finite value. The eyewear device 300 continuously receives a set of the command signals included in the first or second timing signal. Consequently, the light amount adjuster 510 of the eyewear device 300 is locked on to the frame frequency determined by the set of command signals to execute the adjustment operation to the light amount. Accordingly, the viewer may appropriately observe the stereoscopic, first or second video. Unless the set of command signals included in the first or second timing signal is appropriately received or if there is a change in the operating frequency of the light amount adjuster 510, the eyewear device 300 enters the flywheel mode. Consequently, the eyewear device 300 may continue the adjustment operation to the light amount by means of the light amount adjuster 510. If the receiver 530 of the eyewear device 300 repeatedly receives the stop signals, the internal signal generator 570 generates internal signals in response to the stop signals. The light amount controller 580 then generates drive signals to stop the light amount adjuster 510 and forcibly enter the operation of the eyewear device 300 into the stop mode. During the stop mode, the light amount adjuster 510 is stopped in a condition where a transmitted light amount to the left and right eyes remains increased (i.e., the left and right shutters 311, 312 are stopped at an opening orientation).

In the stop mode, the operating frequency of the eyewear device 300 is an infinite value so that the light amount adjuster 510 is stopped. When the adjustment operation to the light amount is stopped, the light amount adjuster 510 maintains an increased amount of the transmitted light in order to ensure the viewer's safety. Therefore, the viewer may view the ambience without interference with the light amount adjuster 510. It should be noted that the light amount adjuster 510 may maintain an increased amount of the transmitted light as long as the eyewear device 300 continues receiving the stop signals. If the eyewear device 300 in the stop mode receives a set of command signals included in the first or second timing signal, the eyewear device 300 moves to the lock-on mode a predetermined period after the reception time of the set of command signals. Consequently, the eyewear device 300 operates the light amount adjuster 510 at a predetermined operation frequency (finite value). It should be noted that the light amount adjuster 510 of the eyewear device 300 may keep stopped to maintain an increased amount of the transmitted light without reception of the stop signals unless the first or second timing signal is received for a predetermined period after the light amount adjuster 510 is stopped in response to reception of the stop signals with allowing the increased light transmission amount.

As described above, unless a set of command signals included in the first or second timing signal is appropriately received, the flywheel mode is started. The eyewear device 300 in the flywheel mode continues the adjustment operation to the light amount by means of the light amount adjuster 510 in response to a set of the previously received command signals. The operating frequency of the flywheel mode is maintained for at least several seconds. If the eyewear device 300 in the flywheel mode once again receives a set of the command signals, which define a consistent operating frequency, the eyewear device 300 operates in the lock-on mode. Otherwise, if the eyewear device 300 in the flywheel mode receives a set of the command signals once again, which newly define an operating frequency, the eyewear device 300 operates in the lock-on mode. Unless the first or second timing signal is received for a predetermined period from the start of the flywheel mode, the eyewear device 300 changes from the flywheel mode to the stop mode.

<Command Signal>

Figure 7:
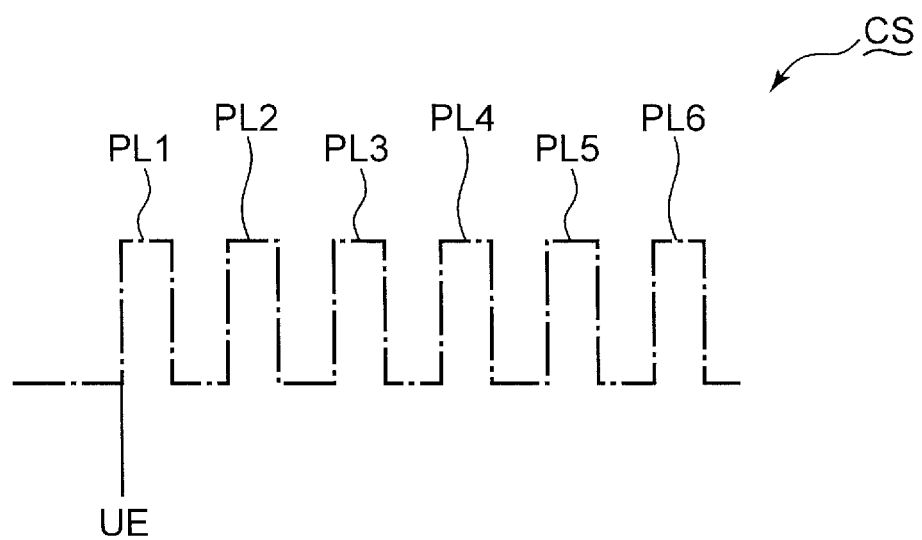
FIG. 7 is a schematic view of a command signal which is defined by a communication protocol of the video system shown in FIG. 1.
Figure 8:
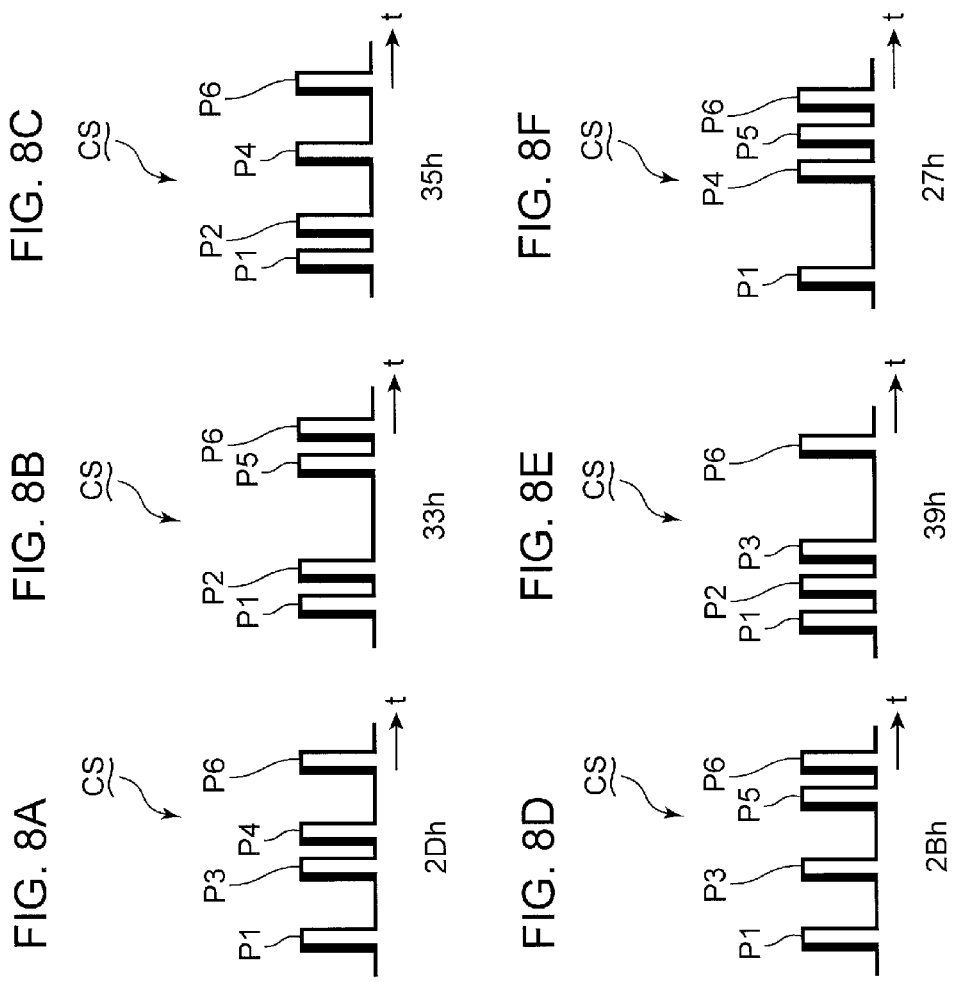
FIG. 8A is a schematic view of the command signal which is defined by the communication protocol of the video system shown in FIG. 1.
FIG. 8B is a schematic view of the command signal which is defined by the communication protocol of the video system shown in FIG. 1.
FIG. 8C is a schematic view of the command signal which is defined by the communication protocol of the video system shown in FIG. 1.
FIG. 8D is a schematic view of the command signal which is defined by the communication protocol of the video system shown in FIG. 1.
FIG. 8E is a schematic view of the command signal which is defined by the communication protocol of the video system shown in FIG. 1.
FIG. 8F is a schematic view of the command signal which is defined by the communication protocol of the video system shown in FIG. 1.

FIG. 7 is a schematic view of the command signal CS, which is defined by the communication protocol between the display device 200 and the eyewear device 300. The command signal CS is described with reference to FIGS. 4, 5 and 7.

The command signal CS includes pulse signals which are transmitted at a consistent frequency. FIG. 7 shows six pulse positions PL1 to PL6 in which the pulse signals may be turned ON. In this implementation, a duty cycle between ON and OFF is 50%.

In this implementation, the pulse signal at the pulse position PL1 is set to ON. The rising edge UE of the pulse signal is processed as a reference point about the reception time of the command signal CS. The pulse signal at the pulse position PL6 is also set to ON. The eyewear device 300 refers to the ON signal at the pulse position PL6 to detect the trailing end of the command signal CS.

Based on the ON/OFF setting at the pulse positions PL2 to PL5 between the pulse positions PL1, PL6, the analyzer 550 of the eyewear device 300 interprets control contents instructed by the command signal CS.

FIGS. 8A to 8F show various command signals CS. The command signals CS are further described with reference to FIGS. 4, 5, 7 to 8F.

In this implementation, a number of pulse signals set to ON in one command signal CS is four.

With regard to the command signal CS shown in FIG. 8A, the pulse signals P1, P3, P4, P6, which correspond to the pulse positions PL1, PL3, PL4, PL6, are set to ON, respectively. The notation "2Dh" in FIG. 8A means a corresponding hexadecimal to the ON/OFF pattern of the pulse signals in the command signal CS of FIG. 8A.

With regard to the command signal CS shown in FIG. 8B, the pulse signals P1, P2, P5, P6, which correspond to the pulse positions PL1, PL2, PL5, PL6, are set to ON, respectively. The notation "33$h$" in FIG. 8B means a corresponding hexadecimal to the ON/OFF pattern of the pulse signals in the command signal CS of FIG. 8B.

With regard to the command signal CS shown in FIG. 8C, the pulse signals P1, P2, P4, P6, which correspond to the pulse positions PL1, PL2, PL4, PL6, are set to ON, respectively. The notation "35$h$" in FIG. 8C means a corresponding hexadecimal to the ON/OFF pattern of the pulse signals in the command signal CS of FIG. 8C.

With regard to the command signal CS shown in FIG. 8D, the pulse signals P1, P3, P5, P6, which correspond to the pulse positions PL1, PL3, PL5, PL6, are set to ON, respectively. The notation "2Bh" in FIG. 8D means a corresponding hexadecimal to the ON/OFF pattern of the pulse signals in the command signal CS of FIG. 8D.

With regard to the command signal CS shown in FIG. 8E, the pulse signals P1, P2, P3, P6, which correspond to the pulse positions PL1, PL2, PL3, PL6, are set to ON, respectively. The notation of "39$h$" in FIG. 8E means a corresponding hexadecimal to the ON/OFF pattern of the pulse signals in the command signal CS of FIG. 8E.

With regard to the command signal CS shown in FIG. 8F, the pulse signals P1, P4, P5, P6, which correspond to the pulse positions PL1, PL4, PL5, PL6, are set to ON, respectively. The notation of "27$h$" in FIG. 8F means a corresponding hexadecimal to the ON/OFF pattern of the pulse signals in the command signal CS of FIG. 8F.

If the communication protocol between the display device 200 and the eyewear device 300 determines that only the signals of the ON/OFF patterns shown in FIGS. 8A to 8F are communicated, and if the receiver 530 receives signals with a pattern, which is not shown in FIGS. 8A to 8F, the detector 540 or the analyzer 550 may process the signals received by the receiver 530 as noise signals. If the receiver 530 receives signals of the patterns shown in FIGS. 8A to 8F, the analyzer 550 records reception times of the signals received by the receiver 530 and other information required for the control of the light amount adjuster 510 in the storage portion 560.

As described above, the command signal is a pulse stream including the four pulses set to ON. A pulse stream includes the first pulse (at the pulse position PL1) and the sixth pulse (at the pulse position PL6). The type of command signals is determined with reference to the ON/OFF pattern between the first and sixth pulses.

<Pattern of Command Signals>

In order to achieve the aforementioned operation mode of the eyewear device 300, four patterns about a set of command signals (referred to as "command set" in the following description) are prepared. A command set includes two or four pulse commands. If a command set is received, the eyewear device 300 determines the operation mode. The signal having the aforementioned pulse pattern "2Dh" is processed as a command signal which is initially transmitted within the command set. The signal having the pulse pattern "2Dh" is commonly used in the four types of command sets. The light amount adjuster 510 executes the adjustment operation to the light amount on the basis of the reference time (aforementioned rising edge UE) of the signal having the pulse pattern "2Dh". The four command sets are shown below.

<Command Set A in Stereoscopic Display Mode>

The command set A includes command signals with the pulse patterns "2Dh", "33$h$", "35$h$" and "2Bh".

<Command Set B in Stereoscopic Display Mode>

The command set B includes the command signals with the pulse patterns "2Dh", "2Bh", "35$h$" and "33$h$".

<Command Set in Dual Display Mode>

The command set in the dual display mode includes the command signals of "2Dh" and "27$h$".

<Command Set in Stop Mode>

The command set in the stop mode includes the command signals of "2Dh" and "39$h$".

The transmitter 420 of the display device 200 selectively transmits "command set A in the stereoscopic display mode", "command set B in the stereoscopic display mode", "command set in the dual display mode" or "command set in the stop mode" in response to the display mode defined by input video signals to the display device 200 or the switching operation of the display mode.

As described above, the command signal having the pulse pattern "2Dh" is commonly used as a control signal which is transmitted in the stereoscopic display mode, the dual display mode and the stop mode. In this implementation, the command signal having the pulse signal of "2Dh" is exemplified as the shared command signal.

The control signal generator 460 of the display device 200 operating in the stereoscopic display mode generates a first timing signal, which has the four types of command signals including the command signal of the pulse pattern "2Dh". When the analyzer 550 of the eyewear device 300 determines that the control signal includes the aforementioned four types of command signals, the light amount adjuster 510 executes the first assistance operation under control of the light amount controller 580.

The control signal generator 460 of the display device 200 operating in the dual display mode generates a second timing signal, which includes a command signal having the pulse pattern "2Dh" and a command signal having the pulse pattern "27$h$". The command signal having the pulse pattern "27$h$" is different from the four types of command signals included in the first timing signal, which is generated in the stereoscopic display mode. If the analyzer 550 of the eyewear device 300 determines that the control signal includes a command signal having the pulse pattern "27$h$", the light amount adjuster 510 executes the second assistance operation under the control of the light amount controller 580. In this implementation, the command signal having the pulse pattern "27h" is exemplified as the first unshared command signal.

As described above, when the display mode of the display device 200 is switched, the control signal generator 460 generates the stop signals to stop the eyewear device 300 from executing the first assistance operation for assisting in viewing the stereoscopic video or the second assistance operation for assisting in viewing the first or second video. The stop signal includes a command signal having the pulse pattern "2Dh" and a command signal having the pulse pattern "39h". The command signal having the pulse pattern "39h" is different from the four types of command signals included in the first timing signal, which is generated in the stereoscopic display mode, and the two types of command signals included in the second timing signal.

When the display mode of the display device 200 is switched, the receiver 530 of the eyewear device 300 receives the stop signals including the command signal having the pulse pattern "2Dh" and the command signal having the pulse pattern "39h". If the analyzer 550 of the eyewear device 300 determines that the control signal includes the command having the pulse pattern "2Dh" and the command signal having the pulse pattern "39h", the light amount adjuster 510 stops under control of the light amount controller 580 and maintains an increased amount of the transmitted light. In this implementation, the command signal having the pulse pattern "39h" is exemplified as the second unshared signal.

<Operation of Eyewear Device in Stereoscopic Display Mode>

Figure 9:
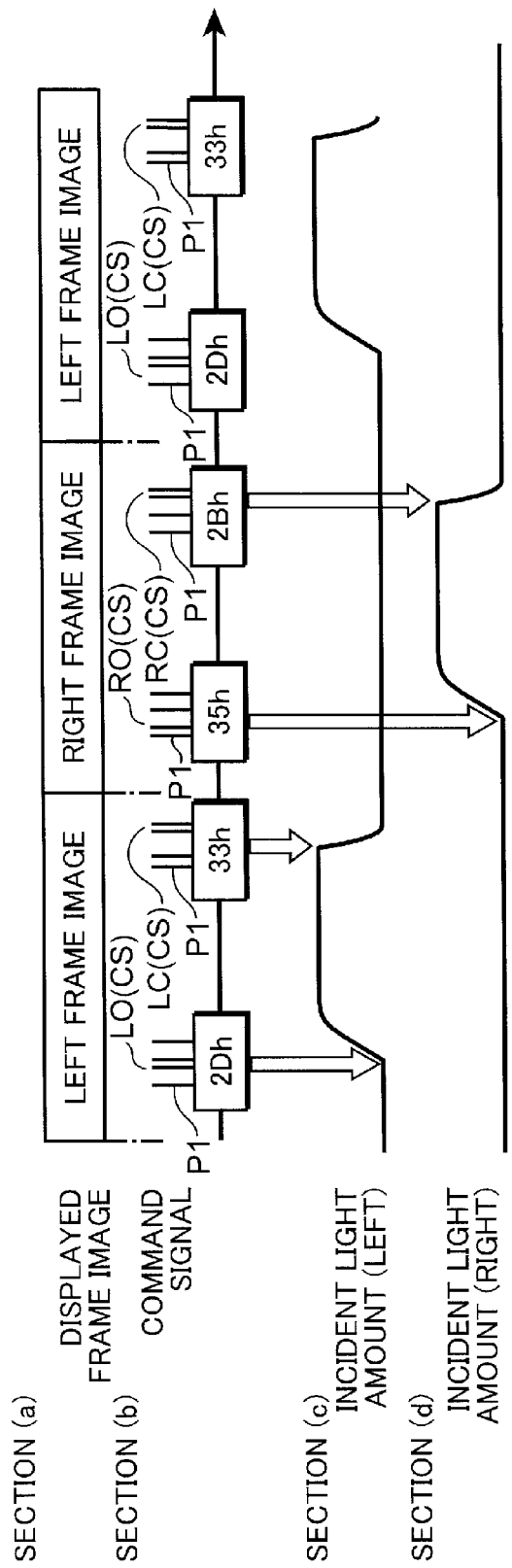
FIG. 9 is a schematic timing chart showing the operation (stereoscopic display mode) of the eyewear device depicted in FIG. 5.
Figure 10:
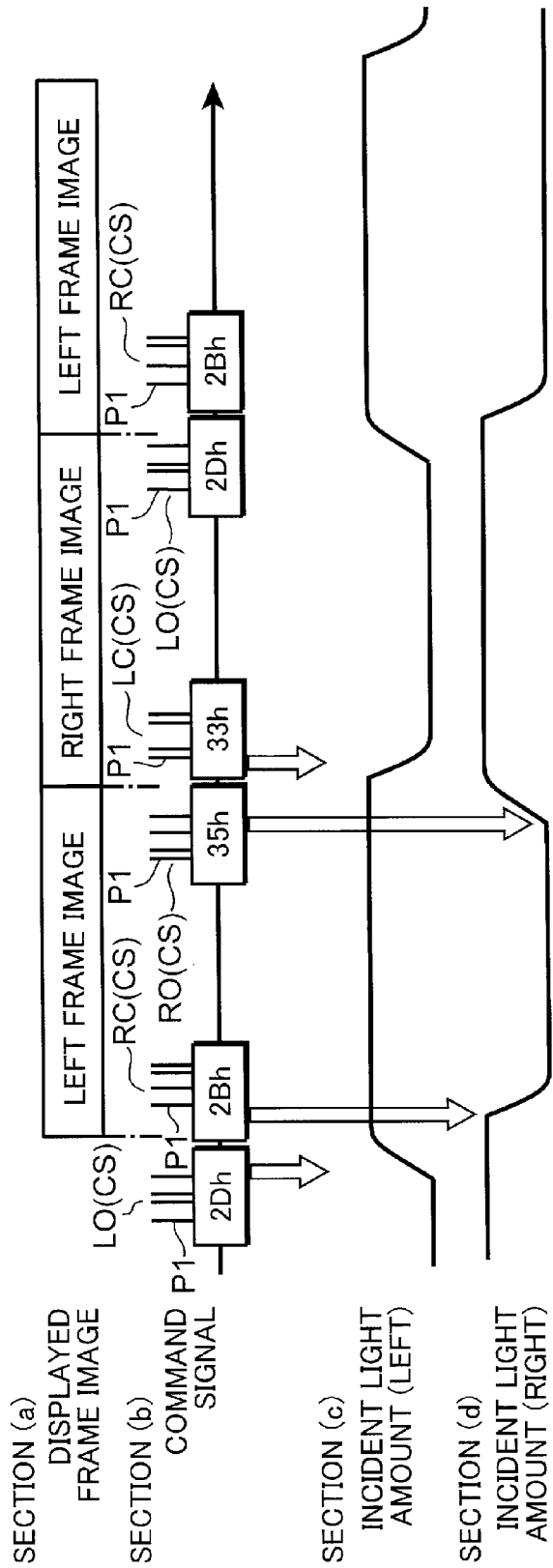
FIG. 10 is a schematic timing chart showing the operation (stereoscopic display mode) of the eyewear device depicted in FIG. 5.

FIGS. 9 and 10 are schematic timing charts showing an operation of the eyewear device 300 in the stereoscopic display mode. The operation of the eyewear device 300 in the stereoscopic display mode is described with reference to FIGS. 1, 4, 5, 8A to 10.

Sections (a) of FIGS. 9 and 10 show frame images displayed on the display portion 410 of the display device 200. The display portion 410 of the display device 200 alternately displays the left and right frame images in the stereoscopic display mode.

Sections (b) of FIGS. 9 and 10 show command signals received by the receiver 530 of the eyewear device 300. Sections (c) of FIGS. 9 and 10 show a change in an incident light amount to the left eye. Sections (d) of FIGS. 9 and 10 show a change in an incident light amount to the right eye.

In this implementation, the command signal CS having the ON/OFF pulse pattern of the pulse (hereinafter referred to as "pulse pattern") represented by the hexadecimal "2Dh" is used as a left increase signal LO, which notifies the view start timing of the left frame image. The command signal CS having the pulse pattern represented by the hexadecimal "33h" is used as a left decrease signal LC, which notifies the view end timing of the left frame image. The command signal CS having the pulse pattern represented by the hexadecimal "35h" is used as a right increase signal RO, which notifies the view start timing of the right frame image. The command signal CS having the pulse pattern represented by the hexadecimal "2Bh" is used as a right decrease signal RC, which notifies the view end timing of the right frame image. In this implementation, the shared command signal (pulse pattern: "2Dh") of the first timing signal notifies the view start timing of the left frame image. Alternatively, the shared command signal of the first timing signal may notify the view start timing of the right frame image.

As shown in sections (c) of FIGS. 9 and 10, the left adjuster 511 increases the incident light amount to the left eye at the reception time of the left increase signal LO in synchronization with the reception of the left increase signal LO. The left adjuster 511 decreases the incident light amount to the left eye at the reception time of the left decrease signal LC in synchronization with the reception of the left decrease signal LC.

As shown in sections (d) of FIGS. 9 and 10, the right adjuster 512 increases the incident light amount to the right eye at the reception time of the right increase signal RO in synchronization with the reception of the right increase signal RO. The right adjuster 512 decreases the incident light amount to the right eye at the reception time of the right decrease signal RC in synchronization with the reception of the right decrease signal RC.

The analyzer 550 of the eyewear device 300 acquires various types of information from the control signals with reference to the shared command signal (pulse pattern: "2Dh"). If the analyzer 550 finds four types of the command signals (pulse patterns: "2Dh", "33h", "35h" and "2Bh") in a cycle of the shared command signal, the analyzer 550 determines that the light amount adjuster 510 executes the first assistance operation.

The analyzer 550 analyzes a reception order of the command signals CS as well as a number of types of the command signals CS. The analyzer 550 processes signals, which are received between receptions of a left increase signal LO and the next left increase signal LO by the receiver 530, as one signal group to determine the reception order of the command signals CS. For example, the reception order of the command signals CS shown in FIG. 9 is the left increase signal LO, the left decrease signal LC, the right increase signal RO and the right decrease signal RC. The reception order of the command signals CS shown in FIG. 10 is the left increase signal LO, the right decrease signal RC, the right increase signal RO and the left decrease signal LC.

As shown in sections (c) and (d) of FIGS. 9 and 10, the light amount adjuster 510 varies an incident light amount to the left and right eyes in response to the reception order of the command signals CS.

As described above, if the receiver 530 sequentially and cyclically receives the command signals having the pulse patterns of "2Dh", "33h", "35h" and "2Bh", or if the receiver 530 sequentially and cyclically receives the command signals having the pulse patterns of "2Dh", "2Bh", "35h" and "33h", the eyewear device 300 determines that the display device 200 displays a video in the stereoscopic display mode. If an order of the pulse patterns of the received command signals is "2Dh", "33h", "35h" and "2Bh", the eyewear device 300 determines to operate the light amount adjuster 510 in the operation mode described with reference to FIG. 9. If an order of the pulsed patterns of the received command signals is "2Dh", "2Bh", "35h" and "33h", it is determined that the light amount adjuster 510 operates under the operation mode described with reference to FIG. 10.

The left adjuster 511 of the eyewear device 300 starts increasing an incident light amount to the left eye (i.e., starts opening the left shutter 311) at the reception time of the rising edge of the first pulse signal P1 having the pulse pattern "2Dh". The left adjuster 511 of the eyewear device 300 starts decreasing the incident light amount to the left eye (i.e., starts closing the left shutter 311) at the reception time of the rising edge of the first pulse signal P1 having the pulse pattern "33h". It should be noted that the left adjuster 511 may perform the reduction adjustment to the incident light amount so as to achieve a predetermined transmittance (e.g., 50%) at a predetermined time after the reception time of the rising edge of the first pulse signal P1 having the pulse pattern "33h". The right adjuster 512 of the eyewear device 300 starts increasing an incident light amount to the right eye (i.e., starts opening the right shutter 312) at the reception time of the rising edge of the first pulse signal P1 having the pulse pattern "35h". The right adjuster 512 of the eyewear device 300 starts decreasing the incident light amount to the right eye (i.e., starts closing the right shutter 312) at the reception time of the rising edge of the first pulse signal P1 having the pulse pattern "2Bh". It should be noted that the right adjuster 512 may perform the reduction adjustment to the incident light amount so as to achieve a predetermined transmittance (e.g., 50%) at a predetermined time after the reception time of the rising edge of the first pulse signal P1 having the pulse pattern "35h".

<Operation of Eyewear Device in Dual Display Mode>

Figure 11:
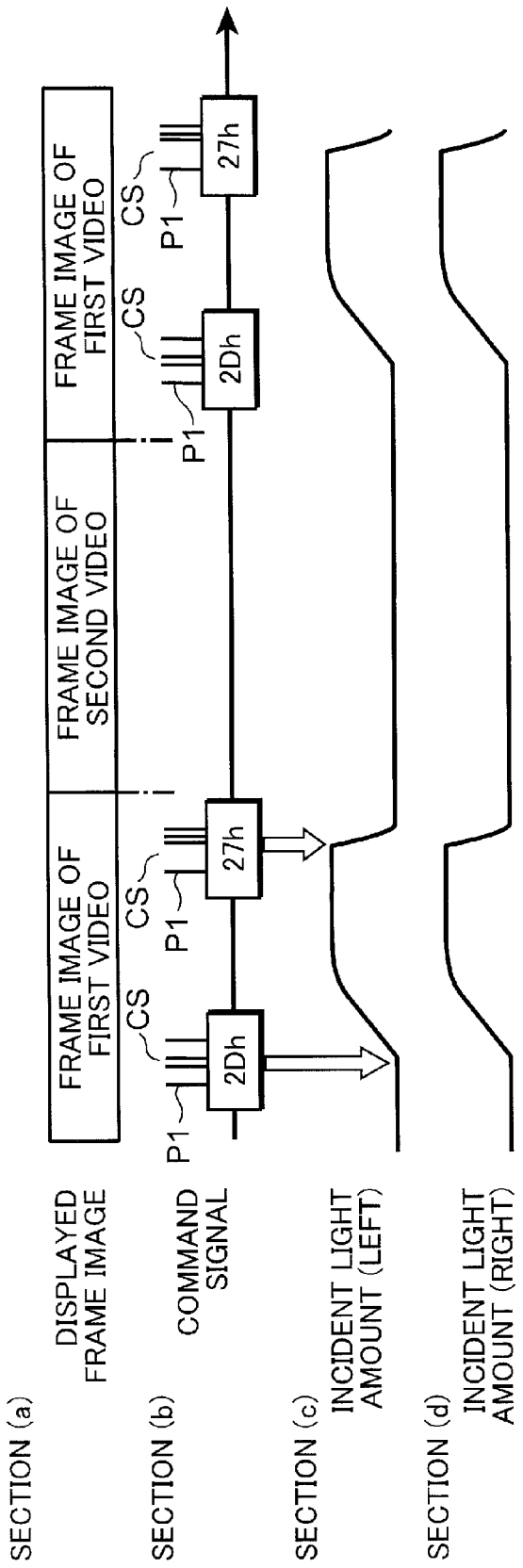
FIG. 11 is a timing chart schematically showing the operation (dual display mode) of the eyewear device depicted in FIG. 5.
Figure 12:
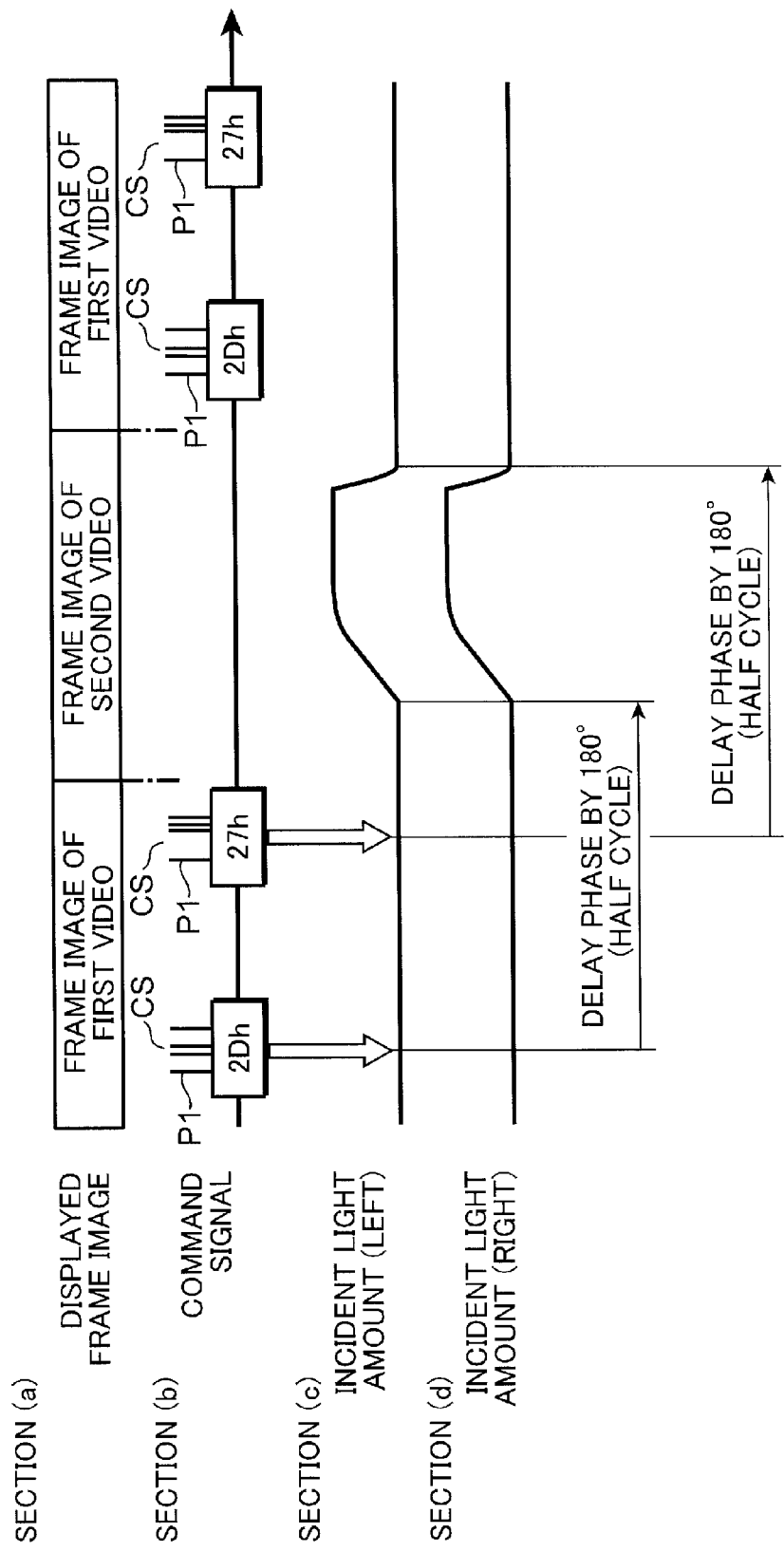
FIG. 12 is a timing chart schematically showing the operation (dual display mode) of the eyewear device depicted in FIG. 5.

FIG. 11 is a timing chart schematically showing an operation of the eyewear device 300 of a viewer who selects the first video. FIG. 12 is a timing chart schematically showing an operation of the eyewear device 300 of another viewer who selects the second video. The operations of the eyewear device 300 in the dual display mode are described with reference to FIGS. 1, 4, 5, 11 and 12.

Sections (a) of FIGS. 11 and 12 show frame images which are displayed on the display portion 410 of the display device 200 in the dual display mode. The display portion 410 alternately displays frame images of the first and second videos.

Sections (b) of FIGS. 11 and 12 show command signals received by the receiver 530 of the eyewear device 300. Sections (c) of FIGS. 11 and 12 show a change in an incident light amount to the left eye. Sections (d) of FIGS. 11 and 12 show a change in an incident light amount to the right eye.

In the dual display mode, the transmitter 420 of the display device 200 transmits a command signal CS having a pulse pattern represented by the hexadecimal "2Dh" and a command signal CS having a pulse pattern represented by the hexadecimal "27h" as the control signal. The command signal CS having the pulse pattern represented by the hexadecimal "2Dh" is used as an increase signal, which notifies the view start timing of the first video. The command signal CS having the pulse pattern represented by the hexadecimal "27h" is used as a decrease signal, which notifies the view end timing of the first video. It should be noted that the light amount adjuster 510 may perform the reduction adjustment to the incident light amount so as to achieve a predetermined transmittance (e.g., 50%) at a predetermined time after the reception time of the rising edge of the first pulse signal P1 having the pulse pattern "27h".

In this implementation, the shared command signal (pulse pattern: "2Dh") of the second timing signal is used as the increase signal, which notifies the view start timing of the first video. Alternatively, the shared command signal of the second timing signal may notify the view start timing of the second video.

The analyzer 550 of the eyewear device 300 acquires various types of information from the control signals with reference to the shared command signal (pulse pattern: "2Dh"). If the analyzer 550 finds the command signal CS having the pulse pattern represented by the hexadecimal "27h" in a cycle of the shared command signal, the analyzer 550 determines that the light amount adjuster 510 executes the second assistance operation.

As described with reference to FIG. 5, the internal signal generator 570 generates internal signals in response to output information from the selector 520 (information representing whether the first or second video is selected) in addition to the information acquired by the analyzer 550. If the information from the selector 520 represents that the viewer selects the first video, the internal signal generator 570 generates internal signals, which cause the left and right adjusters 511, 512 to increase an incident light amount to both eyes at the reception time of the command signal CS having the pulse pattern represented by the hexadecimal "2Dh". In addition, if the information from the selector 520 represents that the viewer selects the first video, the internal signal generator 570 generates internal signals, which cause the left and right adjusters 511, 512 to decrease an incident light amount to both eyes at the reception time of the command signal CS having the pulse pattern represented by the hexadecimal "27h".

The internal signal generator 570 uses information stored by the analyzer 550 in the storage portion 560 to determine a reception cycle of the shared command signal (pulse pattern: "2Dh"). If the information from the selector 520 represents that the viewer selects the second video, the internal signal generator 570 generates internal signals, which cause the left and right adjusters 511, 512 to increase an incident light amount to both eyes at a time in which the phase is delayed by "180°" (i.e., time delayed by half a cycle) from the reception time of the command signal CS having the pulse pattern represented by the hexadecimal "2Dh". In addition, if the information from the selector 520 represents that the viewer selects the second video, the internal signal generator 570 generates internal signals, which cause the left and right adjusters 511, 512 to decrease an incident light amount to both eyes at a time in which the phase is delayed by "180°" (i.e., time delayed by half a cycle) from the reception time of the command signal CS having the pulse pattern represented by the hexadecimal "27h".

As shown in sections (c) and (d) of FIG. 11, if the viewer uses the selector 520 to select the first video, the light amount adjuster 510 increases the incident light amount to the left and right eyes between the reception times of the shared command signal (pulse pattern: "2Dh") and the first unshared command signal (pulse pattern: "27h"), which is received subsequent to the aforementioned shared command signal under control of the light amount controller 580. Until the shared command signal (pulse pattern: "2Dh") is thereafter received once again, the light amount adjuster 510 decreases the incident light amount to the left and right eyes under the control of the light amount controller 580.

If the viewer uses the selector to select the second video, the light amount adjuster 510 increases the incident light amount to the left and right eyes during a period defined by the reception times of the first unshared command signal (pulse pattern: "27h") and the shared command signal (pulse pattern: "2Dh") which is received subsequent to the aforementioned first unshared command signal. Until the first unshared command signal (pulse pattern: "27h") is thereafter received once again, the light amount adjuster 510 decreases the incident light amount to the left and right eyes.

<Switching Operation of Display Mode>

Operations of the display device 200 and the eyewear device 300 upon the switching operation from the stereoscopic display mode to the dual display mode are described. It should be noted that the following description about the switching operation is similarly applied to a switching operation from the dual display mode to the stereoscopic display mode. For example, if the viewer switches a video from movie contents to other contents than a movie or if the viewer changes a program channel displayed on the display device 200, a display frequency or display phase of frame images on the display device 200 may vary. In this implementation, a flicker during the display mode change is prevented as a result of communicating the stop signals associated with the display mode change.

Figure 13:
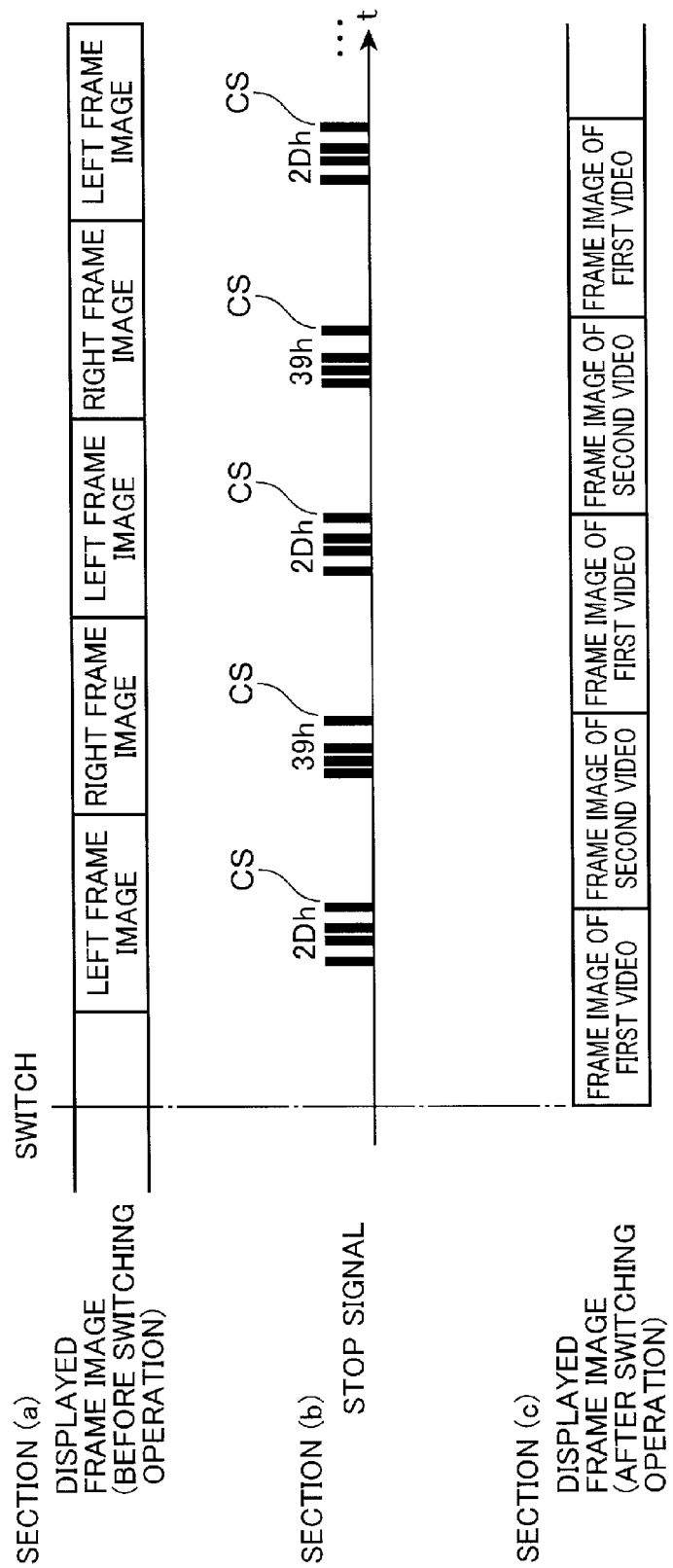
FIG. 13 is a timing chart showing stop signals which are transmitted and received in the video system depicted in FIG. 1.

FIG. 13 is a timing chart showing the stop signals, which are transmitted when the display mode is switched from the stereoscopic display mode to the dual display mode. The stop signals are described with reference to FIGS. 1, 4, 5, 11 to 13.

Section (a) of FIG. 13 shows display timings of frame images on the display portion 410 before the display mode is switched. Section (c) of FIG. 13 shows frame images displayed on the display portion 410 after the display mode is switched. As shown in sections (a) and (c) of FIG. 13, the display timings of the frame images are varied after the switching operation of the display mode.

Section (b) of FIG. 13 shows the stop signals which are transmitted and received pursuant to the switching operation of the display mode. When the display mode is switched, the transmitter 420 of the display device 200 transmits the command signals CS having the pulse patterns represented by the hexadecimals "2Dh" and "39h". If the pulse patterns of the signals received by the receiver 530 of the eyewear device 300 are a combination of "2Dh" and "39h", the analyzer 550 determines that a stop signal is transmitted. As described above, the command signal CS having the pulse pattern "39h" is not used in the stereoscopic and dual display modes. On the other hand, the command signal CS having the pulse pattern "2Dh" is a signal which is used in the stereoscopic and dual display modes.

Under reception of the command signal having the pulse pattern "39h" subsequent to the command signal having the pulse pattern "2Dh", the analyzer 550 of the eyewear device 300 interprets that the light amount adjuster 510 should keep an increased incident light amount to the left and right eyes (i.e., stop and keep the left and right shutters 311, 312 at open orientations).

In this implementation, the transmitter 420 of the display device 200 transmits the stop signals, for instance, five times or more. If the receiver 530 receives the stop signals, for instance, five times, the analyzer 550 of the eyewear device 300 interprets that the light amount adjuster 510 should stop and maintain the light amount which reaches the left and right eyes. Consequently, the operation of the eyewear device 300 becomes less susceptible to noise signals.

The transmitter 420 of the display device 200 then transmits command signals CS which are used for the dual display mode (c.f., FIGS. 11 and 12). If the receiver 530 receives the second timing signal, for instance, five times, the analyzer 550 of the eyewear device 300 interprets that the opening/closing operation of the light amount adjuster 510 should be executed in accordance with the dual display mode.

Figure 14:
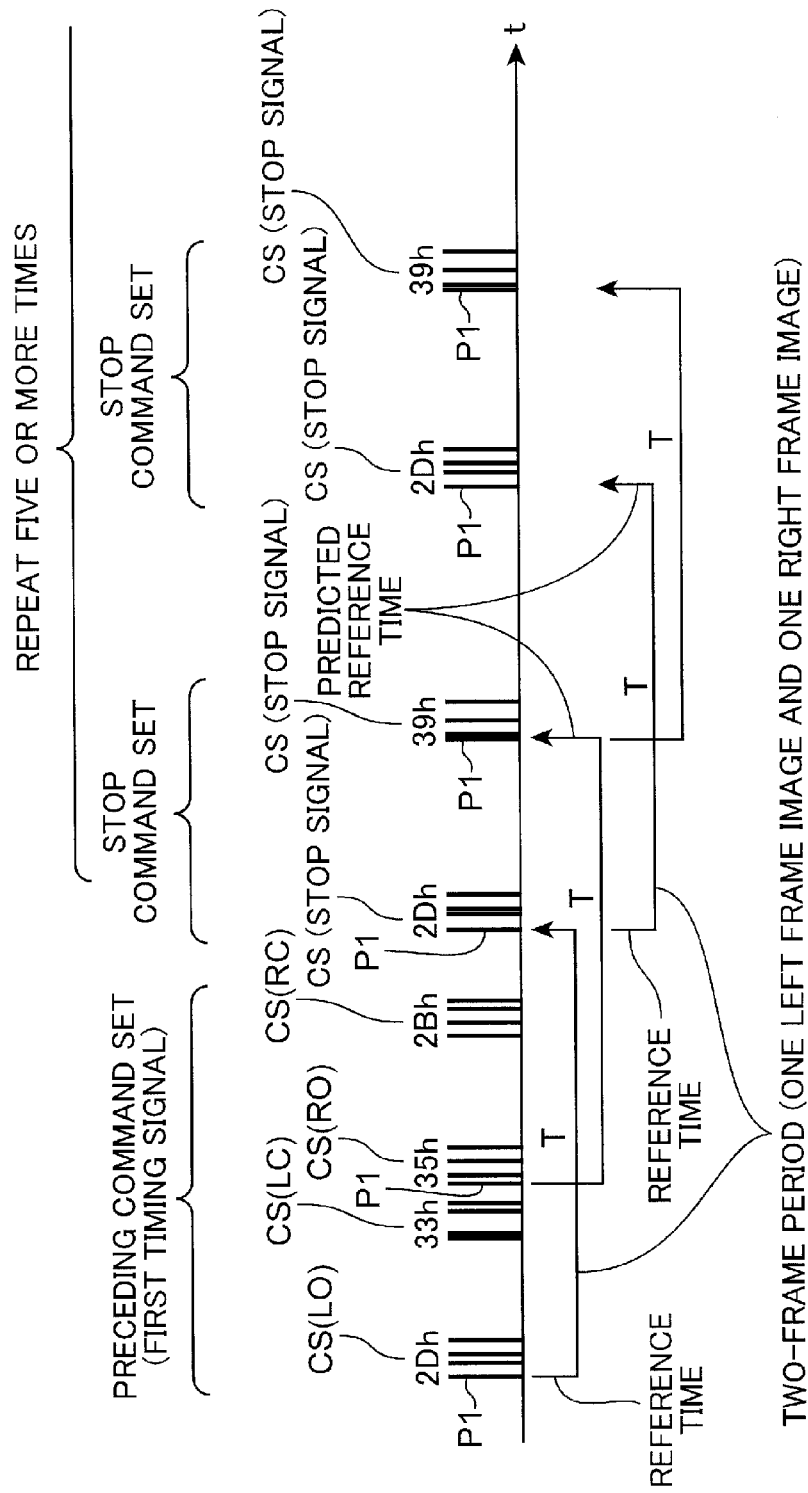
FIG. 14 is a timing chart schematically showing transmission pattern variation of the command signals which are used by the video system depicted in FIG. 1.

FIG. 14 is a timing chart schematically showing a variation in a transmission pattern of the command signals CS associated with the switch operation of the display mode from the stereoscopic display mode to the dual display mode. The variation in the transmission pattern of the command signals CS is described with reference to FIGS. 4, 5, 9, 13 and 14.

As described with reference to FIG. 9, during the stereoscopic display mode, the command signals CS having the pulse pattern "2Dh" are sequentially transmitted as the left increase signal LO at a predetermined cycle "T" corresponding to the operating frequency. The command signal CS having the pulse pattern "33h" is sequentially transmitted as the left decrease signal LC at a predetermined cycle "T" corresponding to the operating frequency. The command signal CS having the pulse pattern "35h" is sequentially transmitted as the right increase signal RO at a predetermined cycle "T" corresponding to the operating frequency. The command signal CS having the pulse pattern "2Bh" is sequentially transmitted as the right decrease signal RC at a predetermined cycle "T" corresponding to the operating frequency.

As described with reference to FIG. 13, under a switching operation from the stereoscopic display mode to the dual display mode, the stop signals are transmitted. The command signal CS of the stop signal having the pulse pattern "2Dh" is transmitted the cycle "T" after the command signal having the pulse pattern "2Dh" which is transmitted as the immediately preceding left increase signal LO. The command signal CS of the stop signal having the pulse pattern "39h" is transmitted the cycle "T" after the command signal having the pulse pattern "35h" which is transmitted as the immediately preceding right increase signal RO.

The transmitter 420 and/or the control signal generator 460 of the display device 200 causes a cyclic transmission pattern of the command signals CS of the stop signals to coincide with the cyclic transmission pattern of the command signals CS of the first timing signals which are transmitted during the stereoscopic display mode. As described above, since the command signal CS of the stop signal having the pulse pattern "2Dh" is also used as the first timing signal and since the transmission timing of the command signals having the pulse pattern "2Dh" is substantially consistent between the first timing signal and the stop signal, the eyewear device 300 may appropriately determine whether the signal having the pulse pattern "2Dh" received by the receiver 530 is a noise signal. Since the transmission timing of the command signal CS having the pulse pattern "39h", which is transmitted after the command signal having the pulse pattern "2Dh", also coincides with the transmission timing of one of the command signals CS of the first timing signal (in this implementation, the command signal CS having the pulse pattern "35h"), which is transmitted during the stereoscopic display mode, the analyzer 550 of the eyewear device 300 may compare the command signal CS having the pulse pattern "39h" with the reception timing of the command signal CS, which is received during the stereoscopic display mode, to similarly perform the noise identification.

The analyzer 550 stores control data associated with the stop signals, which are appropriately received in the aforementioned noise identification, in the storage portion 560. The internal signal generator 570 stops the operation of the light amount adjuster 510 on the basis of the control data associated with the stop signals in the storage portion 560. Consequently, the light amount adjuster 510 is stopped at a condition where the incident light amount to the left and right eyes remains increased.

The transmitter 420 of the display device 200 then transmits the second timing signals in response to the display of the frame images in the dual display mode. The analyzer 550 records control data associated with the second timing signals, which are transmitted in the dual display mode, in the storage portion 560. The internal signal generator 570 generates internal signals in response to the newly recorded second timing signals without using the control data which are recorded in the storage portion 560 before receiving the stop signals. Consequently, the subsequent adjustment operation to the light amount by the light amount adjuster 510 may appropriately synch with the frame image display in the dual display mode.

As described above, in order to prevent an accidental stoppage of the eyewear device 300, the eyewear device 300 executes the stop operation only after consecutive reception of the stop signals at least five times. If the stop signals are continuously received, the eyewear device 300 changes to the stop mode from the previously executed operation mode, a predetermined period after the reference time of "2Dh" of the initially received stop command set (reception time of the first pulse signal P1 of the 2Dh command signal). If another command signal is received, the eyewear device 300 changes to the operation mode determined by the other command signal, a predetermined time after the reference time of the other command signal.

The command set in the stop mode is transmitted while the two frame images (left frame image and right frame image) are displayed. As the transmission timing of the stop signal, the stop signal is transmitted in synch with the transmission timing of the command signal which is transmitted in the previous operation.

In the transmission pattern described with reference to FIG. 14, the "2Dh" command signal of the stop signal is transmitted the two-frame period after the preceding "2Dh". Likewise, the "39h" command signal of the stop signal is transmitted the two-frame period after the preceding "35h" command signal. The reception times of the "2Dh", "39h" and "35h" command signals are determined with reference to the reception times of the first pulse signals P1 of the aforementioned command signals.

Since all command sets include the "2Dh" command signal, the eyewear device 300 may expect to receive the "2Dh" command signal once again after the two-frame period if the eyewear device 300 receives the "2Dh" command signal. Likewise, the eyewear device 300 may predict the "39h" command signal with reference to the reception time of the preceding "35h" command signal. Accordingly, the eyewear device 300 is less susceptible to noises.

Figure 15:
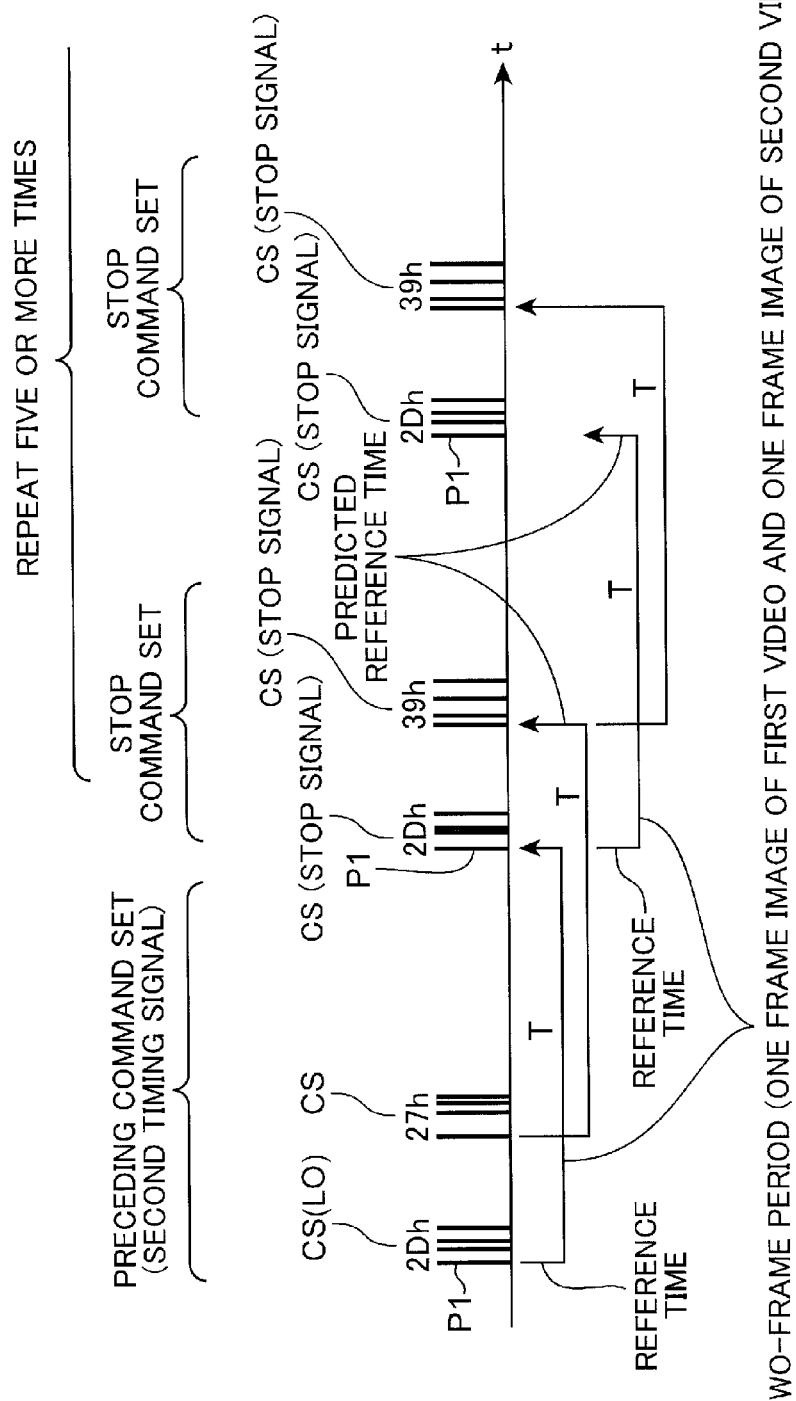
FIG. 15 is a timing chart schematically showing another transmission pattern variation of the command signals which are used by the video system depicted in FIG. 1.

FIG. 15 is a timing chart schematically showing a variation in transmission pattern of the command signals CS in response to the switch operation of the display mode from the dual display mode to the stereoscopic display mode. The variation in the transmission pattern of the command signals CS is described with reference to FIGS. 4, 5, 11 and 15.

As described with reference to FIG. 11, during the stereoscopic display mode, the command signals CS having the pulse pattern "2Dh" are sequentially transmitted as signals, which cause the left and right adjusters 511, 512 to increase an incident light amount at a predetermined cycle "T" corresponding to the operating frequency. The command signals CS having the pulse pattern "27h" are sequentially transmitted as signals, which cause the left and right adjusters 511, 512 to decrease the incident light amount at a predetermined cycle "T" corresponding to the operating frequency.

As described above, under the switching operation from the dual display mode to the stereoscopic display mode, the stop signals are transmitted. The command signal CS of the stop signal having the pulse pattern "2Dh" is transmitted the cycle "T" after the command signal having the pulse pattern "2Dh", which is transmitted as the immediately preceding signal for causing the left and right adjusters 511, 512 to increase the incident light amount. The command signal CS of the stop signal having the pulse pattern "39h" is transmitted the cycle "T" after the command signal having the pulse pattern "27h", which is transmitted as the immediately preceding signal for causing the left and right adjusters 511, 512 to decrease the incident light amount.

The transmitter 420 and/or the control signal generator 460 of the display device 200 causes a cyclic transmission pattern of the command signals CS of the stop signal to coincide with the cyclic transmission pattern of the command signals CS of the second timing signals, which are transmitted during the dual display mode. As described above, since the command signal CS of the stop signal having the pulse pattern "2Dh" is also used as the second timing signal, and since the transmission timing of the command signal having the pulse pattern "2Dh" is substantially consistent between the second timing signal and the stop signal, the eyewear device 300 may appropriately determine whether a signal having the pulse pattern "2Dh" received by the receiver 530 is a noise signal. Since the transmission timing of the command signal CS having the pulse pattern "39h", which is transmitted after the command signal having the pulse pattern "2Dh", also coincides with the transmission timing of the command signal CS having the pulse pattern "27h" of the second timing signal that is transmitted during the dual display mode, the analyzer 550 of the eyewear device 300 may compare the reception timing of the command signal CS having the pulse pattern "39h" with the reception timing of the command signal CS (pulse pattern: "27h"), which is received during the dual display mode, to similarly perform the noise identification.

The analyzer 550 stores control data associated with the stop signals, which are appropriately received under the aforementioned noise identification, in the storage portion 560. The internal signal generator 570 stops the operation of the light amount adjuster 510 in response to the control data associated with the stop signals in the storage portion 560. Consequently, the light amount adjuster 510 is stopped at a condition where the incident light amount to the left and right eyes remains increased.

The transmitter 420 of the display device 200 then transmits the first timing signals in response to the frame image display in the stereoscopic display mode. The analyzer 550 stores control data associated with the first timing signals, which are transmitted in the stereoscopic display mode, in the storage portion 560. The internal signal generator 570 generates internal signals in response to the newly recorded first timing signal without using the control data, which are recorded in the storage portion 560 before receiving the stop signal. Consequently, the subsequent adjustment operation to the light amount by the light amount adjuster 510 may appropriately synch with the frame image display in the stereoscopic display mode.

The command set of the stop mode is transmitted while two frame images (frame images of first and second videos) are displayed. As the transmission timing of the stop signal, the stop signal is transmitted in synch with the transmission timing of the command signal, which is transmitted in the previous operation.

In the transmission pattern described with reference to FIG. 15, the "2Dh" command signal of the stop signal is transmitted the two-frame period after the preceding "2Dh" command signal. Likewise, the "39h" command signal of the stop signal is transmitted the two-frame period after the preceding "27h" command signal. The reception times of the "2Dh", "39h" and "27h" command signals are determined with reference to the reception times of the first pulses signal P1 of these command signals.

Since all command sets include the "2Dh" command signal, the eyewear device 300 may predict to receive the "2Dh" command signal once again after the two-frame period if the eyewear device 300 receives the "2Dh" command signal. Likewise, the eyewear device 300 may predict the "39h" command signal with reference to the reception time of the preceding "27h" command signal. Accordingly, the eyewear device 300 is less susceptible to noises.

<Signal Processes>

Figure 16:
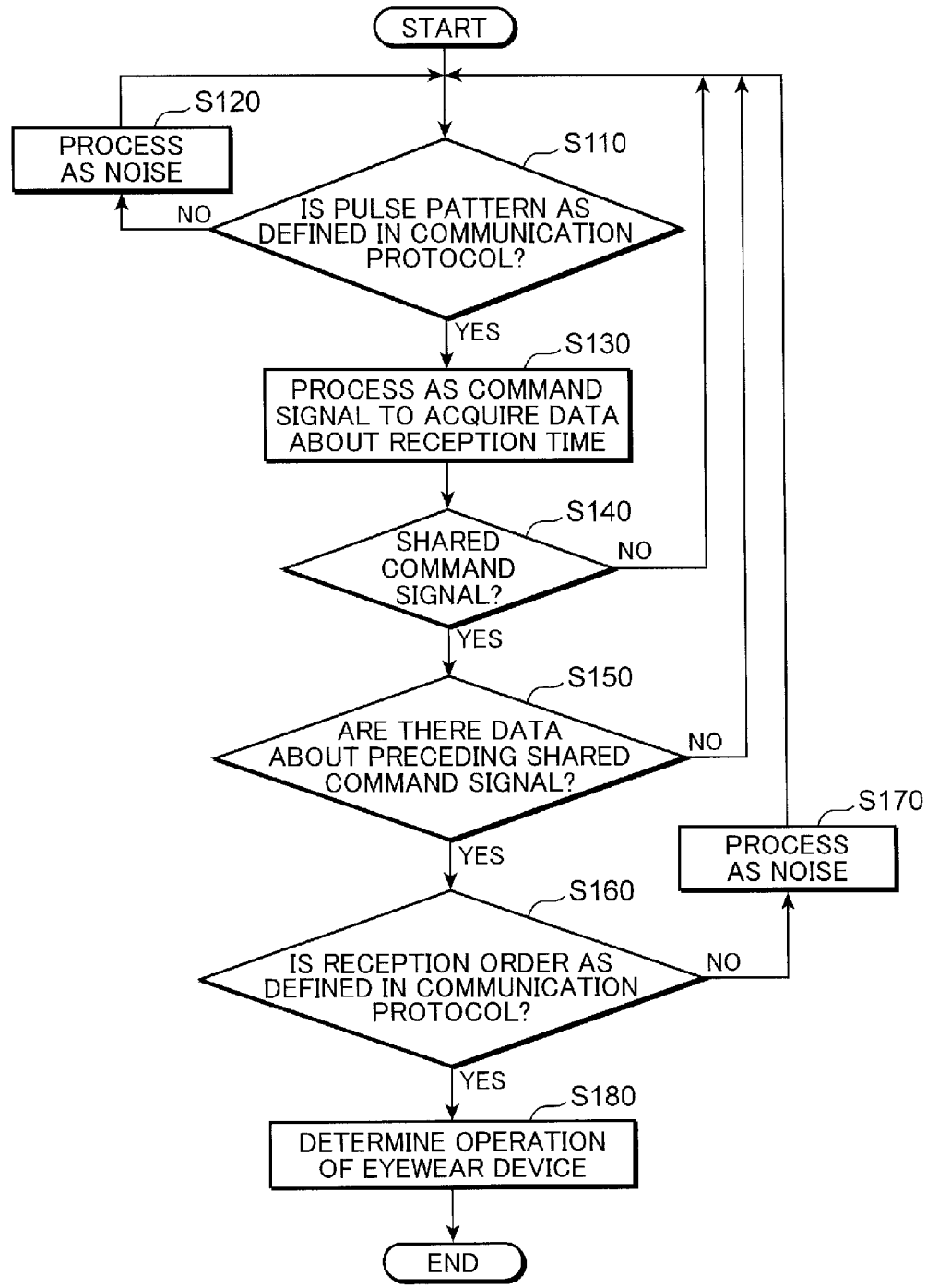
FIG. 16 is a schematic flowchart of signal processes for noise signal elimination performed by the eyewear device depicted in FIG. 5.

FIG. 16 is a schematic flowchart about the signal processes to eliminate noise signals. The noise signal elimination process is described with reference to FIGS. 1, 5 and 16.

(Step S110)

Step S110 is executed when the receiver 530 of the eyewear device 300 receives a signal. In step S110, the detector 540 determines whether the signal received by the receiver 530 has a pulse pattern which is defined in advance between the eyewear device 300 and the display device 200. Unless the signal received by the receiver 530 has a pulse pattern which is defined in advance between the eyewear device 300 and the display device 200, step S120 is executed. If the signal received by the receiver 530 has a pulse pattern which is defined in advance between the eyewear device 300 and the display device 200, step S130 is executed.

(Step S120)

In step S120, the signal received by the receiver 530 is processed as a noise signal. Step S110 is then executed once again.

(Step S130)

In step S130, the signal received by the receiver 530 is processed as a command signal. The detector 540 converts the signal received by the receiver 530 into an electric signal and then outputs the converted electric signal to the analyzer 550. The analyzer 550 acquires data about the reception time and pulse pattern of the command signal. Step S140 is then executed.

(Step S140)

In step S140, the analyzer 550 analyzes the pulse pattern of the command signal to determine whether the command signal is the shared command signal. Unless the command signal is the shared command signal, step S110 is executed once again. If the command signal is the shared command signal, step S150 is executed.

(Step S150)

In step S150, the analyzer 550 determines whether the shared command signal is acquired in advance. If there is no preceding shared command signal, step S110 is executed once again. Otherwise, step S160 is executed.

(Step S160)

In step S160, the analyzer 550 analyzes a reception order of command signals between the shared command signal acquired in advance and the shared command signal acquired thereafter. If the reception order of the command signals is out of the predetermined reception order in the protocol defined in advance between the eyewear device 300 and the display device 200, step S170 is executed. If the reception order of the command signals matches with the predetermined reception order in the protocol defined in advance between the eyewear device 300 and the display device 200, step S180 is executed.

(Step S170)

In step S170, the analyzer 550 determines whether noise signals are contained in the command signals between the shared command signal acquired in advance and the shared command signal acquired thereafter. Step S110 is then executed.

(Step S180)

In step S180, the analyzer 550 compares the reception order of the command signals with the predetermined reception order in the protocol defined in advance between the eyewear device 300 and the display device 200 to determine an operation (first assistance operation, second assistance operation or stop) of the light amount adjuster 510.

The principle of this implementation is not in any way limited to the noise processes shown in FIG. 16. For example, the analyzer may extract noise signal components from a signal included in the shared command signal instead of step S180. For instance, the analyzer may use data about the reception cycle of the command signals which is acquired in advance to identify the noise signal components.

Figure 17B:
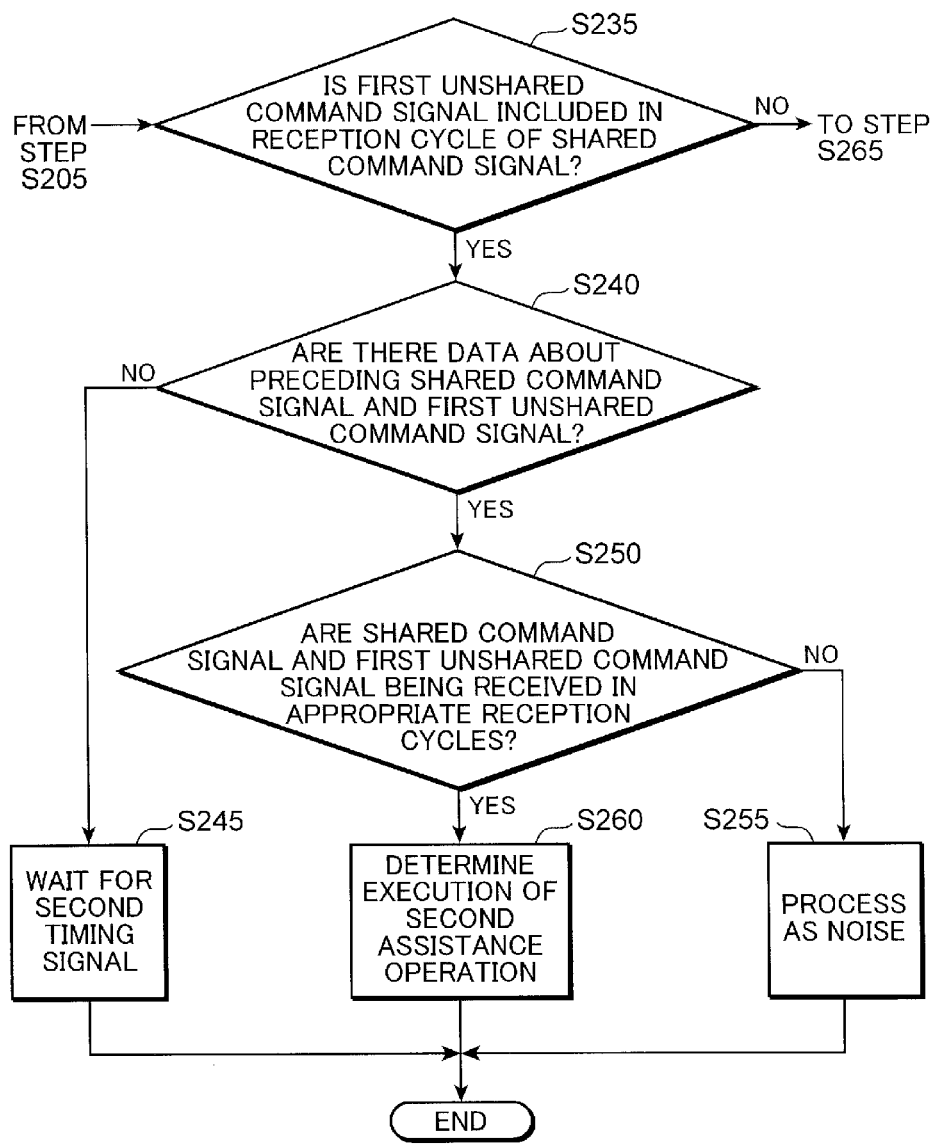
FIG. 17B is a schematic flowchart about the signal processes for determining the operation of the eyewear device depicted in FIG. 5.

FIGS. 17A to 17C are a schematic flowchart about signal processes to determine an operation of the eyewear device 300. The signal processes to determine the operation of the eyewear 300 is described with reference to FIGS. 1, 5, 16 to 17C.

(Step S205)

Step S205 is executed when step S160 described with reference to FIG. 16 is started. In step S205, the analyzer 550 determines whether the four types of command signals are included during the reception cycle of the shared command signal. If the four types of command signals are included during the reception cycle of the shared command signal, step S210 is executed. Unless the four types of command signals are included during the reception cycle of the shared command signal, step S235 is executed.

(Step S210)

In step S210, the analyzer 550 determines whether there are data about the preceding four types of command signals. If there are no data about the preceding four types of command signals, step S215 is executed. If there are the data about the preceding four types of command signals, step S220 is executed.

(Step S215)

In step S215, the analyzer 550 waits for receiving additional four types of command signals. In other words, step S110 described with reference to FIG. 16 is executed once again.

(Step S220)

In step S220, the analyzer 550 compares the data about the preceding four types of command signals with the data about the four types of command signals acquired thereafter to determine whether the four types of command signals are received in an appropriate cycle. Unless the four types of command signals are received in the appropriate cycle, step S225 is executed. If the four types of command signals are received in the appropriate cycle, step S230 is executed.

(Step S225)

In step S225, the analyzer 550 processes the four types of command signals as noise signals. Subsequently, step S110 described with reference to FIG. 16 is executed once again.

(Step S230)

In step S230, the analyzer 550 determines that the light amount adjuster 510 executes the first assistance operation. The analyzer 550 uses data about the reception times of the acquired command signal to store data about the view start timing of the left frame image, the view end timing of the left frame image, the view start timing of the right frame image and the view end timing of the right frame image in the storage portion 560. The internal signal generator 570 uses the aforementioned data to generate internal signals. In response to the internal signals, the light amount controller 580 generates and outputs drive signals to drive the light amount adjuster 510. Consequently, the light amount adjuster 510 may execute the first assistance operation.

(Step S235)

In step S235, the analyzer 550 determines whether the first unshared command signal is included in the reception cycle of the shared command signal. If the first unshared command signal is included in the reception cycle of the shared command signal, step S240 is executed. Unless the first unshared command signal is included in the reception cycle of the shared command signal, step S265 is executed.

(Step S240)

In step S240, the analyzer 550 determines whether there is data about the preceding shared command signal and the first unshared command signal. If there are no data about the preceding shared command signal and the first unshared command signal, step S245 is executed. If there are data about the preceding shared command signal and the first unshared command signal, step S250 is executed.

(Step S245)

In step S245, the analyzer 550 waits for receiving an additional second timing signal. In other words, step S110 described with reference to FIG. 16 is executed once again.

(Step S250)

In step S250, the analyzer 550 compares the data about the preceding shared command signal and the first unshared command signal with the data about the shared command signal and the first unshared command signal, which are acquired thereafter, to determine whether the shared command signal and the first unshared command signal are received in an appropriate cycle. Unless the shared command signal and the first unshared command signal are received in the appropriate cycle, step S255 is executed. If the shared command signal and the first unshared command signal are received in the appropriate cycle, step S260 is executed.

(Step S255)

In step S255, the analyzer 550 processes the shared command signal and the first unshared command signal as noise signals. Subsequently, step S110 described with reference to FIG. 16 is executed once again.

(Step S260)

In step S260, the analyzer 550 determines that the light amount adjuster 510 executes the second assistance operation. The analyzer 550 uses the data about the reception time of the acquired command signal to store data about the view start timing and the view end timing of the first or second video in the storage portion 560. The internal signal generator 570 uses the aforementioned data to generate internal signals. In response to the internal signals, the light amount controller 580 generates and outputs drive signals to drive the light amount adjuster 510. Consequently, the light amount adjuster 510 may execute the second assistance operation.

(Step S265)

In step S265, the analyzer 550 determines whether stop signals (pairs of a shared command signal and a second unshared command signal) are received consecutively five or more times. Unless the stop signals are received consecutively five or more times, step S270 is executed. If the stop signals are received consecutively five or more times, step S275 is executed.

(Step S270)

In step S270, the analyzer 550 waits for receiving an additional stop signal. In other words, step S110 described with reference to FIG. 16 is executed once again.

(Step S275)

In step S275, the analyzer 550 compares the data about the command signals, which are received in advance, with the data about the shared command signal and the second unshared command signal, which are acquired thereafter, to determine whether the shared command signal and the second unshared command signal are received in an appropriate cycle.

If the signal received in advance is the first timing signal, the analyzer 550 determines whether the reception time of the shared command signal of the stop signal substantially coincides with the reception cycle of the shared command signal of the first timing signal. The analyzer 550 also determines whether the reception time of the second unshared command signal coincides with a reception cycle of one of the four types of command signals (excluding the shared command signal) in the first timing signal. If the reception times of both the shared command signal and the second unshared command signal coincides with the reception cycle of the command signal of the first timing signal, step S280 is executed. Otherwise, step S285 is executed.

When the signal received in advance is the second timing signal, the analyzer 550 determines whether the reception time of the shared command signal of the stop signal substantially coincides with the reception cycle of the shared command signal of the second timing signal. The analyzer 550 also determines whether the reception time of the first unshared command signal coincides with the reception cycle of the second unshared command signal. If the reception times of both the shared command signal and the second unshared command signal coincides with the reception cycle of the command signal of the second timing signal, step S280 is executed. Otherwise, step S285 is executed.

If the signal received in advance is the stop signal, the analyzer 550 determines whether the reception times of the shared command signal and the second unshared command signal coincide with the reception cycles of the preceding shared command signal and the preceding second unshared command signal, respectively. If both reception times of the shared command signal and the second unshared command signal coincide with the reception cycles of the preceding shared command signal and the preceding second unshared command signal, step S280 is executed. Otherwise, step S285 is executed.

(Step S280)

In step S280, the analyzer 550 determines that the light amount adjuster 510 stops or maintains the stopped condition. The internal signal generator 570 generates internal signals on the basis of the determination by the analyzer 550. In response to the internal signals, the light amount controller 580 generates and outputs drive signals to stop the light amount adjuster 510. Consequently, the light amount adjuster 510 is stopped at a condition where the light amount, which enters the left and right eyes, is increased.

(Step S285)

In step S285, the analyzer 550 processes the shared command signal and the second unshared command signal as noise signals. Subsequently, step S110 described with reference to FIG. 16 is executed once again.

Figure 18:
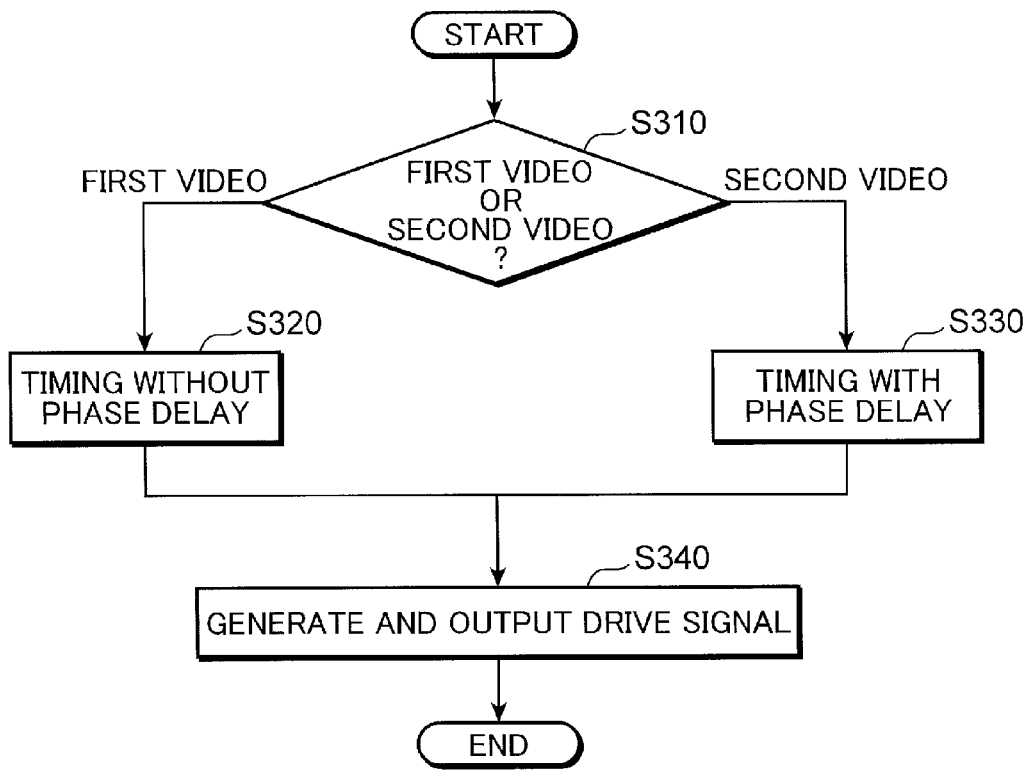
FIG. 18 is a schematic flowchart about signal processes for determining an operation of the eyewear device shown in FIG. 5.

FIG. 18 is a schematic flowchart about signal processes to determine an operation of the eyewear device 300 in the dual display mode. The signal processes to determine the operation of the eyewear device 300 is described with reference to FIGS. 1, 5, 11, 12, 17B and 18.

(Step S310)

Step S310 is executed when step S260 described with reference to FIG. 17B is started. In step S310, the internal signal generator 570 acquires data stored in the storage portion 560 and the data output from the selector 520. If the data output from the selector 520 shows that the viewer selects the first video, step S320 is executed. If the data output from the selector 520 shows that the viewer selects the second video, step S330 is executed.

(Step S320)

In step S320, the internal signal generator 570 generates and outputs internal signals without adding any phase delay to data about the view start timing and the view end timing stored in the storage portion 560. Step S340 is then executed.

(Step S330)

In step S330, the internal signal generator 570 adds a phase delay of half a cycle to the data about the view start timing and the view end timing stored in the storage portion 560 to generate and output internal signals. Step S340 is then executed.

(Step S340)

In step S340, the light amount controller 580 generates and outputs drive signals in response to the internal signal. Therefore, the light amount controller 580 executes the operation shown in FIG. 11 (if passing through step S320) or the operation shown in FIG. 12 (if passing through step S330).

<Control of Video System>

Figure 19:
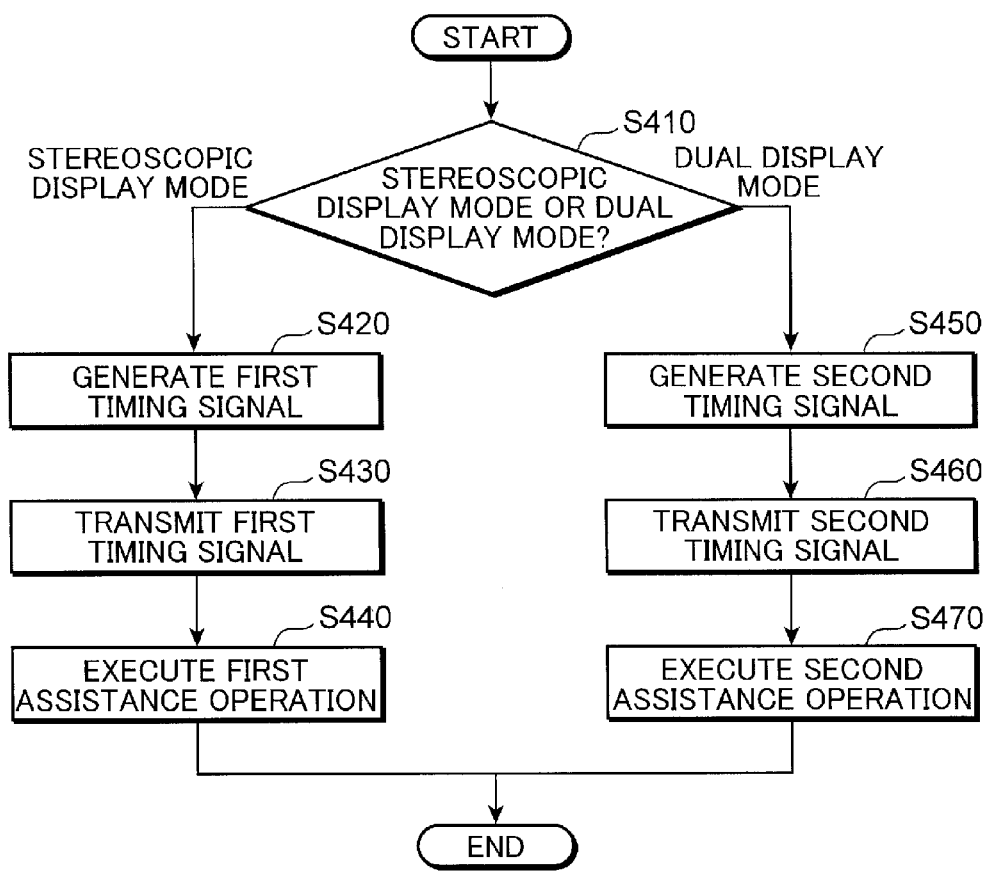
FIG. 19 is a flowchart schematically showing control routines of the video system depicted in FIG. 1.

FIG. 19 is a flowchart schematically showing control routines of the video system 100. The control of the video system 100 is described with reference to FIGS. 1, 4, 5 and 19.

(Step S410)

Step S410 is executed when video signals are input to the display device 200. In step S410, the control signal generator 460 determines whether a video defined in the video signal should be displayed in the stereoscopic or dual display mode. The video signal may include information for determining a display mode for the displayed video. In this case, the control signal generator 460 may use information contained in the video signals to select one of the stereoscopic and dual display modes. Alternatively, the control signal generator 460 may calculate a correlation between video signals separated by the signal separator 440. When a strong correlation is figured out between the video signals, the control signal generator 460 may determine that the video defined by the video signals should be displayed in the stereoscopic display mode. Otherwise, the control signal generator 460 may determine that the video defined by the video signals should be displayed in the dual display mode. If it is determined that the video defined by the video signal should be displayed in the stereoscopic display mode, step S420 is executed. If it is determined that the video defined by the video signal should be displayed in the dual display mode, step S450 is executed.

(Step S420)

In step S420, the control signal generator 460 generates the first timing signal, which includes the four types of command signals to notify the view start timing and the view end timing of the left and right frame images. It should be noted that one of the four types of command signals is the aforementioned shared command signal. After the first timing signal is generated, step S430 is executed.

(Step S430)

In step S430, the transmitter 420 transmits the first timing signals as control signals. Subsequently, step S440 is executed.

(Step S440)

In step S440, the eyewear device 300 executes the first assistance operation in response to the first timing signals. Consequently, in synch with the left frame image display, the left adjuster 511 increases the image light amount which reaches the left eye whereas the right adjuster 512 decreases the image light amount which reaches the right eye. In synch with the right frame image display, the left adjuster 511 decreases the image light amount which reaches the left eye whereas the right adjuster 512 increases the image light amount which reaches the right eye.

(Step S450)

In step S450, the control signal generator 460 generates second timing signals which notify the view start timing and the view end timing of the first video. In this implementation, the shared command signal of the second timing signal notifies the view start timing of the first video. The first unshared command signal of the second timing signal notifies the view end timing of the first video. After the second timing signal is generated, step S460 is executed.

(Step S460)

In step S460, the transmitter 420 transmits the second timing signals as control signals. Subsequently, step S470 is executed.

(Step S470)

In step S470, the eyewear device 300 executes the second assistance operation in response to the second timing signals.

If the viewer uses the selector 520 to select the first video, the light amount adjuster 510 increases an image light amount which reaches the left and right eyes in synch with the first video display. If the viewer uses the selector 520 to select the second video, the light amount adjuster 510 increases the image light amount which reaches the left and right eyes in synch with the second video display.

The aforementioned various implementations are merely exemplary. Accordingly, the principle of the aforementioned implementations is not limited to the explanation in the aforementioned detailed description or drawings. It should be easy to understand that a person skilled in the art may engage in various modifications, combinations and omissions within a scope of principle of the aforementioned implementations.

The aforementioned implementations mainly include the following features.

The display device according to one aspect of the aforementioned implementation switches a display mode between a first display mode for time-divisionally displaying a left frame image, which is observed by a left eye, and a right frame image, which is observed by a right eye, to depict a stereoscopic video and a second display mode for time-divisionally displaying a first video and a second video, which are different in contents from each other. The display device includes: a display portion which displays the stereoscopic video in the first display mode and the first and second videos in the second display mode; and a signal generator which generates a first control signal to notify a view start timing and a view end timing of the left and right frame images in the first display mode and a second control signal to notify a view start timing and a view end timing of one of the first and the second videos in the second display mode. The first control signal has four types of command signals including a shared command signal which is commonly used in the first and second display modes. The second control signal includes the shared command signal and a first unshared command signal which is different from the four types of command signals.

According to the aforementioned configuration, the display device time-divisionally displays a left frame image, which is observed by the left eye, and a right frame image, which is observed by the right eye, to depict a stereoscopic video in the first display mode. The display device time-divisionally displays first and second videos, which are different in contents from each other, in the second display mode. Accordingly, a viewer may view the stereoscopic, first or second video.

Under the first display mode in which the display portion displays the stereoscopic video, the signal generator generates a first control signal having four types of command signals including a shared command signal which is commonly used in the first and second display modes to notify the view start timing and the view end timing of the left and right frame images. Accordingly, the viewer may view the stereoscopic video while the display portion operates in the first display mode.

Under the second display mode in which the display portion displays the first and second videos, the signal generator generates a second control signal including the shared command signal and a first unshared command signal which is different from the four types of command signals to notify the view start timing and the view end timing of one of the first and second videos. Accordingly, the viewer may view the first or second video while the display portion operates in the second display mode.

Since the shared command signal is commonly used in the first and second display modes, control information may be communicated by a fewer numbers of types of signals.

Accordingly, there may be few communicative failures of the control information. Consequently, the display device may allow the viewer to appropriately observe a video in response to the display mode.

In the aforementioned configuration, the shared command signal of the first control signal may notify the view start timing of one of the left and right frame images. The shared command signal of the second control signal may notify the view start timing of one of the first and second videos.

According to the aforementioned configuration, the shared command signal of the first control signal may notify the view start timing of one of the left and right frame images. The shared command signal of the second control signal may notify the view start timing of one of the first and second videos. Since the shared command signal may notify the view start timings in the first and second display modes, processes for the first and second control signals may be simplified.

In the aforementioned configuration, when the display mode is switched, the signal generator may generate a stop signal, which stops an operation of an eyewear device designed to adjust an image light amount to reach each of the left and right eyes so as to assist in viewing the stereoscopic, first or second video. The stop signal may include the shared command signal and a second unshared command signal which is different from the four types of command signals and the first unshared command signal.

According to the aforementioned configuration, the eyewear device may adjust an image light amount to reach each of the left and right eyes so as to assist in viewing the stereoscopic, first or second video. When the display mode is switched, the signal generator generates a stop signal including the shared command signal and a second unshared command signal which is different from the four types of command signals and the first unshared command signal. Accordingly, since the eyewear device may identify a switching operation of the display mode in response to the stop signal, the eyewear device may easily follow the display operation of the display device after the switching operation of the display mode.

Since the stop signal may include the shared command signal, control information may be communicated by a fewer numbers of types of signals. Accordingly, there may be few communicative failures of the control information. Consequently, the display device may allow the viewer to appropriately observe a video in response to the display mode.

In the aforementioned configuration, the display device may further include a transmitter configured to transmit the stop signal. If the display mode is switched from the first display mode to the second display mode, the transmitter may repeatedly transmit the stop signals, and then transmit the second control signal. If the display mode is switched from the second display mode to the first display mode, the transmitter may repeatedly transmit the stop signals, and then transmit the first control signal.

According to the aforementioned configuration, if the display mode is switched from the first display mode to the second display mode, the transmitter may repeatedly transmit the stop signals. Accordingly, the eyewear device may stop adjusting the light amount in response to the highly reliable stop signals. The transmitter may then transmit the second control signal. Since the eyewear device may adjust the light amount in response to the second control signal transmitted after the stop signals, the light amount adjustment by the eyewear device may easily follow the second display mode.

If the display mode is switched from the second display mode to the first display mode, the transmitter may repeatedly transmit the stop signals. Accordingly, the eyewear device may stop adjusting the light amount in response to the highly reliable stop signals. The transmitter may then transmit the first control signal. Since the eyewear device may adjust the light amount in response to the first control signal transmitted after the stop signals, the light amount adjustment by the eyewear device may easily follow the first display mode.

In the aforementioned configuration, if the display mode is switched from the first display mode to the second display mode, the transmitter may transmit the shared command signal of the stop signal at an equivalent cycle to a transmission cycle of the shared command signal of the first control signal. If the display mode is switched from the second display mode to the first display mode, the transmitter may transmit the shared command signal of the stop signal at an equivalent cycle to a transmission cycle of the shared command signal of the second control signal.

According to the aforementioned configuration, if the display mode is switched from the first display mode to the second display mode, the transmitter may transmit the shared command signal of the stop signal at the same cycle as a transmission cycle of the shared command signal of the first control signal. If the display mode is switched from the second display mode to the first display mode, the transmitter may transmit the shared command signal of the stop signal at the same cycle as a transmission cycle of the shared command signal of the second control signal. Accordingly, the eyewear device may stop adjusting the light amount in response to the highly reliable stop signal.

In the aforementioned configuration, if the display mode is switched from the first display mode to the second display mode, the transmitter may transmit the second unshared command signal at an equivalent transmission cycle to one of the four types of command signals excluding the shared command signal. If the display mode is switched from the second display mode to the first display mode, the transmitter may transmit the second unshared command signal at an equivalent transmission cycle to the first unshared command signal.

According to the aforementioned configuration, if the display mode is switched from the first display mode to the second display mode, the transmitter may transmit the second unshared command signal at the same transmission cycle as one of the four types of command signals excluding the shared command signal. If the display mode is switched from the second display mode to the first display mode, the transmitter may transmit the second unshared command signal at the same transmission cycle as the first unshared command signal. Accordingly, the eyewear device may stop adjusting the light amount in response to the highly reliable stop signal.

The eyewear device according to another aspect of the aforementioned implementations switches an operation mode between a first assistance operation for assisting in viewing a stereoscopic video and a second assistance operation for assisting in viewing one of a first video and a second video, which are different in contents from each other, in response to a control signal transmitted from a display device configured to switch a display mode between a first display mode for time-divisionally displaying a left frame image, which is observed by a left eye, and a right frame image, which is observed by a right eye, to depict the stereoscopic video and a second display mode for time-divisionally displaying the first and second videos. The eyewear device includes a receiver configured to receive the control signal; a light amount adjuster configured to adjust an image light amount to reach each of the left and right eyes in response to the control signal including a shared command signal, which is commonly used between the first and second display modes; and a controller which controls the light amount adjuster so that the light amount adjuster executes the first assistance operation if the control signal has four types of command signals including the shared command signal, and the second assistance operation if the control signal includes the shared command signal and a first unshared command signal which is different from the four types of command signals.

According to the aforementioned configuration, the display device time-divisionally displays a left frame image, which is observed by the left eye, and a right frame image, which is observed by the right eye, to depict a stereoscopic video in the first display mode. The display device time-divisionally displays first and second videos, which are different in contents from each other, in the second display mode. The display device transmits a control signal to the eyewear device. The eyewear device switches an operation mode between a first assistance operation for assisting in viewing the stereoscopic video and a second assistance operation for assisting in viewing the first or second video in response to the control signal. Accordingly, a viewer may view the stereoscopic, first or second video.

Since the control signal received by the receiver includes a shared command signal which is commonly used in the first and second display modes, control information may be communicated from the display device to the eyewear device by a fewer numbers of types of signals. Accordingly, there may be few communicative failures of the control information. Consequently, the eyewear device may allow the viewer to appropriately observe a video in response to the display mode.

If the control signal includes the four types of command signals including the shared command signal, the controller causes the light amount adjuster to execute the first assistance operation. Accordingly, the eyewear device may allow the viewer to appropriately observe the stereoscopic video.

If the control signal includes the shared command signal and a first unshared command signal which is different from the four types of command signals, the controller causes the light amount adjuster to execute the second assistance operation. Accordingly, the eyewear device may allow the viewer to appropriately view the first or second video.

In the aforementioned configuration, the controller may cause the light amount adjuster to execute the first assistance operation if the controller finds the four types of command signals in a reception cycle of the shared command signal. The controller may cause the light amount adjuster to execute the second assistance operation if the controller finds the first unshared command signal in the reception cycle of the shared command signal.

According to the aforementioned configuration, since the shared command signal may be commonly used between the first and second display modes, the controller may switch the operation mode in response to signals received within the reception cycle of the shared command signal. If the four types of command signals are found in the reception cycle of the shared command signal, the controller may cause the light amount adjuster to execute the first assistance operation. Accordingly, the eyewear device may allow the viewer to appropriately observe the stereoscopic video. If the first unshared command signal is found in the reception cycle of the shared command signal, the controller may cause the light amount adjuster to execute the second assistance operation. Accordingly, the eyewear device may allow the viewer to appropriately observe the first or second video.

In the aforementioned configuration, the controller may determine the adjustment timing to the light amount toward each of the left and right eyes in response to the reception timing of each of the four types of command signals. In response to the determination of the controller, the light amount adjuster may increase the light amount to the left eye and decrease the light amount to the right eye in synch with display of the left frame image, and increase the light amount to the right eye and decrease the light amount to the left eye in synch with display of the right frame image.

The controller may determine the adjustment timing to the light amount toward each of the left and right eyes in response to the reception timing of each of the four types of command signals. In response to the determination of the controller, the light amount adjuster may increase the light amount to the left eye and decrease the light amount to the right eye in synch with the display of the left frame image. The light amount adjuster may also increase the light amount to the right eye and decrease the light amount to the left eye in synch with the display of the right frame image. Accordingly, the eyewear device may allow the viewer to appropriately observe the stereoscopic video.

In the aforementioned configuration, the eyewear device may further include a selector configured to select the first or second video. The controller may determine the adjustment timing to the light amount toward each of the left and right eyes in response to a reception timing of each of the shared command signal and the first unshared command signal, and a selection by means of the selector.

According to the aforementioned configuration, the controller may determine an adjustment timing to the light amount toward each of the left and right eyes in response to a reception timing of each of the shared command signal and the first unshared command signal, and the selection of the selector. Accordingly, the eyewear device may allow the viewer to appropriately observe the first or second video.

In the aforementioned configuration, if the selector selects one of the first and second videos, the controller may increase the light amounts to the left and right eyes between the reception timings of the shared command signal and the first unshared command signal received subsequent to the shared command signal, and decrease the light amounts to the left and right eyes until the shared command signal is thereafter received. If the selector selects another of the first and second videos, the controller may increase the light amounts to the left and right eyes within a period which is defined by the reception timings of the first unshared command signal and the shared command signal received subsequent to the first unshared command signal, and decrease the light amounts to the left and right eyes until the first unshared command signal is thereafter received.

According to the aforementioned configuration, if the selector selects one of the first and second videos, the controller may increase both the light amounts to the left and right eyes between the reception timings of the shared command signal and the first unshared command signal received subsequent to the shared command signal. The eyewear may allow the viewer to view a displayed image on the display device between the reception timings of the shared command signal and the first unshared command signal received subsequent to the shared command signal. The controller may decrease both the light amounts to the left and right eyes until the shared command signal is thereafter received. Accordingly, the other of the first and second videos may not be viewed. Consequently, the first and second videos may be selectively viewed.

If the selector selects the other of the first and second videos, the controller increases both the light amounts to the left and right eyes within a period which is defined by the reception timings of the first unshared command signal the shared command signal received subsequent to the first unshared command signal. The eyewear may allow the viewer to view a displayed image on the display device within a period which is defined by the reception timings of the first unshared command signal and the shared command signal received subsequent to the first unshared command signal. The controller may decrease both the light amounts to the left and right eyes until the first unshared command signal is thereafter received. Accordingly, the one of the first and second videos may not be viewed. Consequently, the first and second videos may be selectively viewed.

In the aforementioned configuration, the controller may delay an adjustment timing to the light amount toward each of the left and right eyes under selection of the one of the first and second videos by a half of the reception cycle of the shared command signal from an adjustment timing to the light amount toward each of the left and right eyes under selection of the other of the first and second videos.

According to the aforementioned configuration, the controller may delay an adjustment timing to the light amount toward each of the left and right eyes under selection of the one of the first and second videos by a half of the reception cycle of the shared command signal from an adjustment timing to the light amount toward each of the left and right eyes under selection of the other of the first and second videos. Accordingly, the first and second videos may be selectively viewed.

In the aforementioned configuration, the receiver may receive a stop signal including the shared command signal and a second unshared command signal which is different from the shared command signal and the first unshared command signal. If the receiver repeatedly receives the stop signals, the controller may control the light amount adjuster to continue increasing the light amounts to the left and right eyes.

According to the aforementioned configuration, the receiver may receive a stop signal including the shared command signal and a second unshared command signal which is different from the shared command signal and the first unshared command signal. If the receiver repeatedly receives the stop signals, the controller may control the light amount adjuster. Accordingly, the controller may control the light amount adjuster in response to the highly reliable stop signals. As a result of performing the control in response to the stop signal, both the light amounts to the left and right eyes may be kept at an increased level. Consequently, the viewer may see the ambience through the light amount adjuster.

The video system according to yet another aspect of the aforementioned implementations includes a display device configured to switch a display mode between a first display mode for time-divisionally displaying a left frame image, which is observed by a left eye, and a right frame image, which is observed by a right eye, to depict a stereoscopic video, and a second display mode for time-divisionally displaying a first video and a second video, which are different in contents from each other; and an eyewear device which switches an operation mode between a first assistance operation for assisting in viewing the stereoscopic video and a second assistance operation for assisting in viewing the first or second video. The display device includes a display portion configured to display the stereoscopic video in the first display mode and the first and second videos in the second display mode; a signal generator configured to generate a first control signal to notify a view start timing and a view end timing of each of the left and right frame images in the first display mode and a second control signal to notify a view start timing and view end timing of one of the first and second videos in the second display mode. The first control signal has four types of command signals including a shared command signal which is commonly used in the first and second display modes. The second control signal includes the shared command signal and a first unshared command signal which is different from the four types of command signals. The display device also includes a transmitter configured to selectively transmit the first or second control signal as a control signal in response to the display mode. The eyewear device includes: a receiver configured to receive the control signal; a light amount adjuster configured to adjust an image light amount to reach each of the left and right eyes in response to the control signal; and a controller which controls the light amount adjuster so that the light amount adjuster executes the first assistance operation if the control signal has the four types of command signals including the shared command signal, and the second assistance operation if the control signal includes the shared command signal and a first unshared command signal which is different from the four types of command signals.

According to the aforementioned configuration, the display device time-divisionally displays a left frame image, which is observed by the left eye, and a right frame image, which is observed by the right eye, to depict a stereoscopic video in the first display mode. The display device time-divisionally displays first and second videos, which are different in contents from each other, in the second display mode. The display device transmits a control signal to the eyewear device. The eyewear device switches an operation mode between a first assistance operation for assisting in viewing the stereoscopic video and a second assistance operation for assisting in viewing the first or second video in response to the control signal. Accordingly, the viewer may view the stereoscopic, first or second video.

Under the first display mode in which the display portion displays a stereoscopic video, the signal generator generates a first control signal having four types of command signals including a shared command signal which is commonly used in the first and second display modes to notify the view start timing and the view end timing of the left and right frame images. Accordingly, the viewer may view the stereoscopic video while the display portion operates in the first display mode.

Under the second display mode in which the display portion displays the first and second videos, the signal generator generates a second control signal including the shared command signal and a first unshared command signal, which is different from the four types of command signals, to notify the view start timing and the view end timing of one of the first and second videos. Accordingly, the viewer may view the first or second video while the display portion operates in the second display mode.

Since the shared command signal is commonly used in the first and second display modes, control information may be communicated by a fewer numbers of types of signals. Accordingly, there may be few communicative failures of the control information. Consequently, the display device may allow the viewer to appropriately observe a video in response to the display mode.

If the control signal includes the four types of command signals including the shared command signal, the controller may cause the light amount adjuster to execute the first assistance operation. Accordingly, the eyewear device may allow the viewer to appropriately observe the stereoscopic video.

If the control signal includes the shared command signal and a first unshared command signal which is different from the four types of command signals, the controller may cause the light amount adjuster to execute the second assistance operation. Accordingly, the eyewear device may allow the viewer to appropriately view the first or second video.

The control method according to yet another aspect of the aforementioned implementations is applied to a video system provided with a display device configured to switch a display mode between a first display mode for time-divisionally displaying a left frame image, which is observed by a left eye, and a right frame image, which is observed by a right eye, to depict a stereoscopic video and a second display mode for time-divisionally displaying a first video and a second video, which are different in contents from each other, and an eyewear device which switches an operation mode between a first assistance operation for assisting in viewing the stereoscopic video and a second assistance operation for assisting in viewing the first or second video. The control method includes steps of: generating a first control signal having four types of command signals including a shared command signal, which is commonly used in the first and second display modes, to notify a view start timing and a view end timing of each of the left and right frame images if the first display mode is selected, and a second control signal including the shared command signal and a first unshared command signal, which is different from the four types of command signals, to notify a view start timing and a view end timing of one of the first and second videos if the second display mode is selected; transmitting one of the first and second control signals to the eyewear device as a control signal; and causing the eyewear device to adjust an image light amount to reach each of the left and right eyes in response to the control signal.

According to the aforementioned configuration, the display device time-divisionally displays a left frame image, which is observed by the left eye, and a right frame image, which is observed by the right eye, to depict a stereoscopic video in the first display mode. The display device time-divisionally displays the first and second videos, which are different in contents from each other, in the second display mode. The display device transmits a control signal to the eyewear device. The eyewear device switches an operation mode between a first assistance operation for assisting in viewing the stereoscopic video and a second assistance operation for assisting in viewing the first or second video in response to the control signal. Therefore, the viewer may view the stereoscopic, first or second video.

If the first display mode is selected, a first control signal, which has four types of command signals including a shared command signal that is commonly used in the first and second display modes, is generated to notify the view start timing and the view end timing of each of the left and right frame images. If the second display mode is selected, a second control signal, which includes the shared command signal and a first unshared command signal that is different from the four types of command signal, is generated to notify the view start timing and the view end timing of one of the first and second videos.

Since the shared command signal is commonly used in the first and second display modes, control information may be communicated by a fewer numbers of types of signals. Accordingly, there may be few communicative failures of the control information. Consequently, the display device may allow the viewer to appropriately observe a video in response to the display mode.

One of the first and second control signals is transmitted to the eyewear device as a control signal. Since the image light amount to reach each of the left and right eyes is adjusted by the eyewear device in response to the control signal, the viewer may appropriately view the stereoscopic, first or second video.

Industrial Applicability

The principle of the aforementioned implementations may be suitably applied to video display technologies.

The invention claimed is:

1. A display device configured to switch a display mode between a first display mode for time-divisionally displaying a left frame image, which is observed by a left eye, and a right frame image, which is observed by a right eye, to depict a stereoscopic video and a second display mode for time-divisionally displaying a first video and a second video, which are different in contents from each other, the display device comprising:

a display portion which displays the stereoscopic video in the first display mode and the first and second videos in the second display mode; and a signal generator which generates a first control signal to notify a view start timing and a view end timing of the left and right frame images in the first display mode and a second control signal to notify a view start timing and a view end timing of one of the first and second videos in the second display mode, the first control signal having four types of command signals including a shared command signal which is commonly used in the first and second display modes, and the second control signal including the shared command signal and a first unshared command signal which is different from the four types of command signals, wherein the shared command signal of the second control signal notifies one of the view start timing and the view end timing of the one of the first and second videos, wherein the first unshared command signal of the second control signal notifies another of the view start timing and the view end timing of the one of the first and second videos, wherein, when the display mode is switched, the signal generator generates a stop signal, which stops an operation of an eyewear device that adjusts an image light amount to reach each of the left and right eyes so as to assist in viewing the stereoscopic video, the first video or the second video, wherein the stop signal includes the shared command signal and a second unshared command signal, and wherein the second unshared command signal is different from the four types of command signals and the first unshared command signal.

2. The display device according to claim 1, wherein the shared command signal of the first control signal notifies the view start timing of one of the left and right frame images, the shared command signal of the second control signal notifies the view start timing of the one of the first and second videos, and the first unshared command signal of the second control signal notifies the view end timing of the one of the first and second videos.

3. The display device according to claim 1, further comprising:

a transmitter configured to transmit the stop signal, wherein if the display mode is switched from the first display mode to the second display mode, the transmitter repeatedly transmits the stop signal, and then transmits the second control signal, and if the display mode is switched from the second display mode to the first display mode, the transmitter repeatedly transmits the stop signal, and then transmits the first control signal.

4. The display device according to claim 3, wherein
if the display mode is switched from the first display mode to the second display mode, the transmitter transmits the shared command signal of the stop signal at an equivalent cycle to a transmission cycle of the shared command signal of the first control signal, and
if the display mode is switched from the second display mode to the first display mode, the transmitter transmits the shared command signal of the stop signal at an equivalent cycle to a transmission cycle of the shared command signal of the second control signal.

5. The display device according to claim 4, wherein
if the display mode is switched from the first display mode to the second display mode, the transmitter transmits the second unshared command signal at an equivalent transmission cycle to one of the four types of command signals excluding the shared command signal, and
if the display mode is switched from the second display mode to the first display mode, the transmitter transmits the second unshared command signal at an equivalent transmission cycle to the first unshared command signal.

6. An eyewear device for switching an operation mode between a first assistance operation for assisting in viewing a stereoscopic video and a second assistance operation for assisting in viewing one of a first video and a second video, which are different in contents from each other, in response to a control signal transmitted from a display device configured to switch a display mode between a first display mode for time-divisionally displaying a left frame image, which is observed by a left eye, and a right frame image, which is observed by a right eye, to depict the stereoscopic video and a second display mode for time-divisionally displaying the first and second videos, the eyewear device comprising:
a receiver configured to receive the control signal including a shared command signal, which is commonly used between the first and second display modes;
a light amount adjuster which is electrically connected to the receiver and responsive to the control signal to adjust an image light amount that reaches each of the left and right eyes; and
a controller which is electrically connected to the receiver and responsive to the control signal and generates a drive signal to control the light amount adjuster so that the light amount adjuster executes the first assistance operation if the control signal has four types of command signals including the shared command signal, and executes the second assistance operation if the control signal includes the shared command signal and a first unshared command signal which is different from the four types of command signals,
wherein, while executing the second assistance operation, the light amount adjuster increases or decreases the image light amount to reach both of the left and right eyes in response to the shared command signal,
wherein, while executing the second assistance operation, the light amount adjuster decreases or increases the image light amount to reach both of the left and right eyes in response to the first unshared command signal,
wherein the receiver receives a stop signal including the shared command signal and a second unshared command signal which is different from the shared command signal and the first unshared command signal, and
wherein, if the receiver repeatedly receives the stop signal, the controller controls the light amount adjuster to continue increasing the image light amounts to the left and right eyes.

7. The eyewear device according to claim 6, wherein
the controller causes the light amount adjuster to execute the first assistance operation if the controller finds the four types of command signals in a reception cycle of the shared command signal, and
the controller causes the light amount adjuster to execute the second assistance operation if the controller finds the first unshared command signal in the reception cycle of the shared command signal.

8. The eyewear device according to claim 7, wherein
the controller determines an adjustment timing to the image light amount toward each of the left and right eyes in response to a reception timing of each of the four types of command signals, and
in response to the determination of the controller, the light amount adjuster increases the image light amount to the left eye and decreases the image light amount to the right eye in synchronization with a display of the left frame image, and increases the image light amount to the right eye and decreases the image light amount to the left eye in synchronization with a display of the right frame image.

9. The eyewear device according to claim 7, further comprising:
a selector configured to select the first video or the second video, wherein
the controller determines an adjustment timing to the image light amount toward each of the left and right eyes in response to a reception timing of each of the shared command signal and the first unshared command signal, and a selection of the selector.

10. The eyewear device according to claim 9, wherein
if the selector selects one of the first and second videos, the controller increases the image light amounts to the left and right eyes between reception timings of the shared command signal and the first unshared command signal received subsequent to the shared command signal, and decreases the image light amounts to the left and right eyes until the shared command signal is subsequently received after the first unshared command signal, and
if the selector selects another of the first and second videos, the controller increases the image light amounts to the left and right eyes within a period which is defined by reception timings of the first unshared command signal and the shared command signal received subsequent to the first unshared command signal, and decreases the image light amounts to the left and right eyes until the first unshared command signal is subsequently received after the shared command signal.

11. The eyewear device according to claim 10, wherein
the controller delays an adjustment timing to the image light amount toward each of the left and right eyes under selection of the one of the first and second videos by a half of the reception cycle of the shared command signal from an adjustment timing to the image light amount toward each of the left and right eyes under selection of the other of the first and second videos.

* * * * *